(12) United States Patent
Yasumatsu

(10) Patent No.: US 11,237,471 B2
(45) Date of Patent: Feb. 1, 2022

(54) LIGHT SOURCE DEVICE AND PROJECTOR

(71) Applicant: SEIKO EPSON CORPORATION, Tokyo (JP)

(72) Inventor: Wataru Yasumatsu, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/128,470

(22) Filed: Dec. 21, 2020

(65) Prior Publication Data

US 2021/0191247 A1 Jun. 24, 2021

(30) Foreign Application Priority Data

Dec. 24, 2019 (JP) .............................. JP2019-233468

(51) Int. Cl.
*G03B 21/20* (2006.01)
*G02B 5/30* (2006.01)
*G02B 27/28* (2006.01)

(52) U.S. Cl.
CPC ....... *G03B 21/2073* (2013.01); *G02B 5/3083* (2013.01); *G02B 27/283* (2013.01); *G03B 21/204* (2013.01); *G03B 21/208* (2013.01)

(58) Field of Classification Search
CPC .......................... G03B 21/2073; G03B 21/207; G03B 21/208; G02B 5/3083; G02B 27/283
USPC ......................................................... 353/20
See application file for complete search history.

(56) References Cited

U.S. PATENT DOCUMENTS

| 10,444,611 | B2* | 10/2019 | Pan ........................ G03B 33/06 |
| 2003/0090597 | A1 | 5/2003 | Katoh et al. |
| 2009/0190074 | A1 | 7/2009 | Woo et al. |
| 2013/0027670 | A1 | 1/2013 | Akiyama et al. |
| 2016/0170260 | A1 | 6/2016 | Wachi et al. |

FOREIGN PATENT DOCUMENTS

| EP | 0465171 | 1/1992 |
| EP | 0905542 | 3/1999 |
| JP | 04-060538 | 2/1992 |
| JP | H 11-109285 | 4/1999 |
| JP | H 11-295652 | 10/1999 |
| JP | 2000-131762 | 5/2000 |
| JP | 2000-147500 | 5/2000 |
| JP | 2002-335471 | 11/2002 |
| JP | 2005-221885 | 8/2005 |

(Continued)

*Primary Examiner* — Jerry L Brooks
(74) *Attorney, Agent, or Firm* — Dority & Manning, P.A.

(57) ABSTRACT

A light source device according to the present disclosure includes a light source section, a first light separation element for transmitting a part of first light entering the first light separation element irrespective of a polarization component, and reflecting another part of the first light irrespective of a polarization component, a second light separation element for reflecting a part of the first light entering the second light separation element, a diffusion element for diffusing and emitting another part of the first light entering the diffusion element, and a wavelength conversion element for performing wavelength conversion on a part of the first light entering the wavelength conversion element to emit second light, wherein the second light separation element transmits a first polarization component with respect to the second light, and reflects a second polarization component.

9 Claims, 14 Drawing Sheets

(56) References Cited

FOREIGN PATENT DOCUMENTS

| | | |
|---|---|---|
| JP | 2009-157357 | 7/2009 |
| JP | 2013-167812 | 8/2013 |
| JP | 2015-025835 | 2/2015 |

* cited by examiner

LIGHT SOURCE DEVICE AND PROJECTOR

The present application is based on, and claims priority from JP Application Serial Number 2019-233468, filed Dec. 24, 2019, the disclosure of which is hereby incorporated by reference herein in its entirety.

BACKGROUND

1. Technical Field

The present disclosure relates to a light source device and a projector.

2. Related Art

There has been known a projector which modulates the light emitted from a light source to generate image light based on image information, and then projects the image light thus generated. In JP-A-4-60538 (Document 1), there is disclosed a projection type color image display device provided with a light source, a plurality of dichroic mirrors, a liquid crystal display element having a microlens array, and a projection lens. The projection type color image display device separates the white light emitted from the light source into a plurality of colored light beams having respective colors different from each other, and then makes the colored light beams thus separated from each other enter the respective sub-pixels different from each other in one liquid crystal display element to thereby perform color display.

In the projection type color image display device described above, there are arranged a red reflecting dichroic mirror, a green reflecting dichroic mirror, and a blue reflecting dichroic mirror along the incident light axis of the white light emitted from the light source in a state of being nonparallel to each other. The white light emitted from the light source passes through the dichroic mirrors described above to thereby be separated into red light, green light, and blue light different in proceeding direction from each other. The red light, the green light, and the blue light respectively enter red sub-pixels, green sub-pixels, and blue sub-pixels of the light modulation element in the state of being spatially separated from each other by a microlens disposed on the incidence side of the light modulation element.

In the projection type color image display device in Document 1, a lamp light source such as a halogen lamp or a xenon lamp is adopted as the white light source, and a liquid crystal display element is adopted as the light modulation element. Although the light emitted from the lamp light source is unpolarized light, when using the liquid crystal display element as the light modulation element, the light entering the liquid crystal display element needs to be linearly polarized light having a specific polarization direction. To this end, it is conceivable to dispose a pair of multi-lens arrays for dividing the incident light into a plurality of partial light beams, and a polarization conversion element for uniform the polarization directions of the plurality of partial light beams between the white light source and the liquid crystal display element as a device for homogenously illuminating the liquid crystal display element. In this case, there is often used a polarization conversion element provided with a plurality of polarization split layers and a plurality of reflecting layers alternately arranged along a direction crossing the incident direction of the light, and a retardation layer disposed in a light path of the light transmitted through the polarization split layers or a light path of the light reflected by the reflecting layers.

However, when reducing the projection type color image display device described above in size in compliance with the recent demand of reduction in size, it is difficult to manufacture the polarization conversion element narrow in pitch between the polarization split layer and the reflecting layer. Therefore, it is difficult to reduce the size of the light source device equipped with this type of polarization conversion element, and by extension, to reduce the size of the projector equipped with the light source device. In view of such a problem, it is required to provide a light source device capable of emitting a plurality of colored light beams with a uniform polarization direction without using the polarization conversion element narrow in pitch.

SUMMARY

In view of the problems described above, a light source device according to an aspect of the present disclosure includes a light source section configured to emit first light having a first wavelength band, a first light separation element configured to transmit a part of the first light which enters the first light separation element along a first direction from the light source section, toward the first direction irrespective of a polarization component, and reflect another part of the first light toward a second direction crossing the first direction irrespective of a polarization component, a second light separation element disposed at the first direction side of the first light separation element, and configured to reflect a part of the first light which enters the second light separation element along the first direction from the first light separation element, toward the second direction, a diffusion element disposed at the second direction side of the first light separation element, and configured to diffuse and then emit another part of the first light which enters the diffusion element along the second direction from the first light separation element, toward a third direction as an opposite direction to the second direction, and a wavelength conversion element disposed at the second direction side of the second light separation element, and configured to perform wavelength conversion on a part of the first light which enters the wavelength conversion element along the second direction from the second light separation element, to emit second light having a second wavelength band different from the first wavelength band toward the third direction, wherein the second light separation element transmits a first polarization component toward the third direction with respect to the second light, and reflects a second polarization component of the second light toward a fourth direction as an opposite direction to the first direction.

In the light source device according to the aspect of the present disclosure, in the first light separation element, an entire area of incidence of the first light may transmit a part of the first light, reflect another part of the first light, and reflect the second polarization component.

In the light source device according to the aspect of the present disclosure, in the first light separation element, the area of incidence of the first light may include a first area configured to reflect the first light and reflect the second polarization component, and a second area configured to transmit the first light and reflect the second polarization component.

The light source device according to the aspect of the present disclosure may further include an optical element configured to uniform a polarization direction of another part of the first light which is emitted from the diffusion element and is transmitted through the first light separation element into a specific direction and emit the another part of the first light.

The light source device according to the aspect of the present disclosure may further include a first retardation element configured to convert the first polarization component which is emitted toward the third direction from the second light separation element into the second polarization component.

The light source device according to the aspect of the present disclosure may further include a first color separation element disposed at the third direction side of the first light separation element, and configured to separate light emitted from the first light separation element into third light having the first wavelength band and fourth light having the second wavelength band, and a second color separation element disposed at the third direction side of the second light separation element, and configured to separate light emitted from the second light separation element into fifth light having a third wavelength band different from the second wavelength band, and sixth light having a fourth wavelength band different from the second wavelength band and the third wavelength band.

A projector according to another aspect of the present disclosure includes the light source device according to the aspect of the present disclosure, a light modulation device configured to modulate light from the light source device in accordance with image information, and a projection optical device configured to project the light modulated by the light modulation device.

The projector according to the aspect of the present disclosure may further include a homogenization device disposed between the light source device and the light modulation device, wherein the homogenization device may include a pair of multi-lenses configured to divide the light entering the pair of multi-lenses from the light source device into a plurality of partial light beams, and a superimposing lens configured to superimpose the plurality of partial light beams entering the superimposing lens from the pair of multi-lenses on the light modulation device.

In the projector according to the aspect of the present disclosure, the light modulation device may have a plurality of pixels, the pixels may each include a first sub-pixel, a second sub-pixel, a third sub-pixel, and a fourth sub-pixel, and with respect to each of the pixels, the third light may enter the first sub-pixel, the fourth light may enter the second sub-pixel, the fifth light may enter the third sub-pixel, and the sixth light may enter the fourth sub-pixel.

DESCRIPTION OF EXEMPLARY EMBODIMENTS

First Embodiment

A first embodiment of the present disclosure will hereinafter be described using FIG. 1 through FIG. 9.

Figure 1:
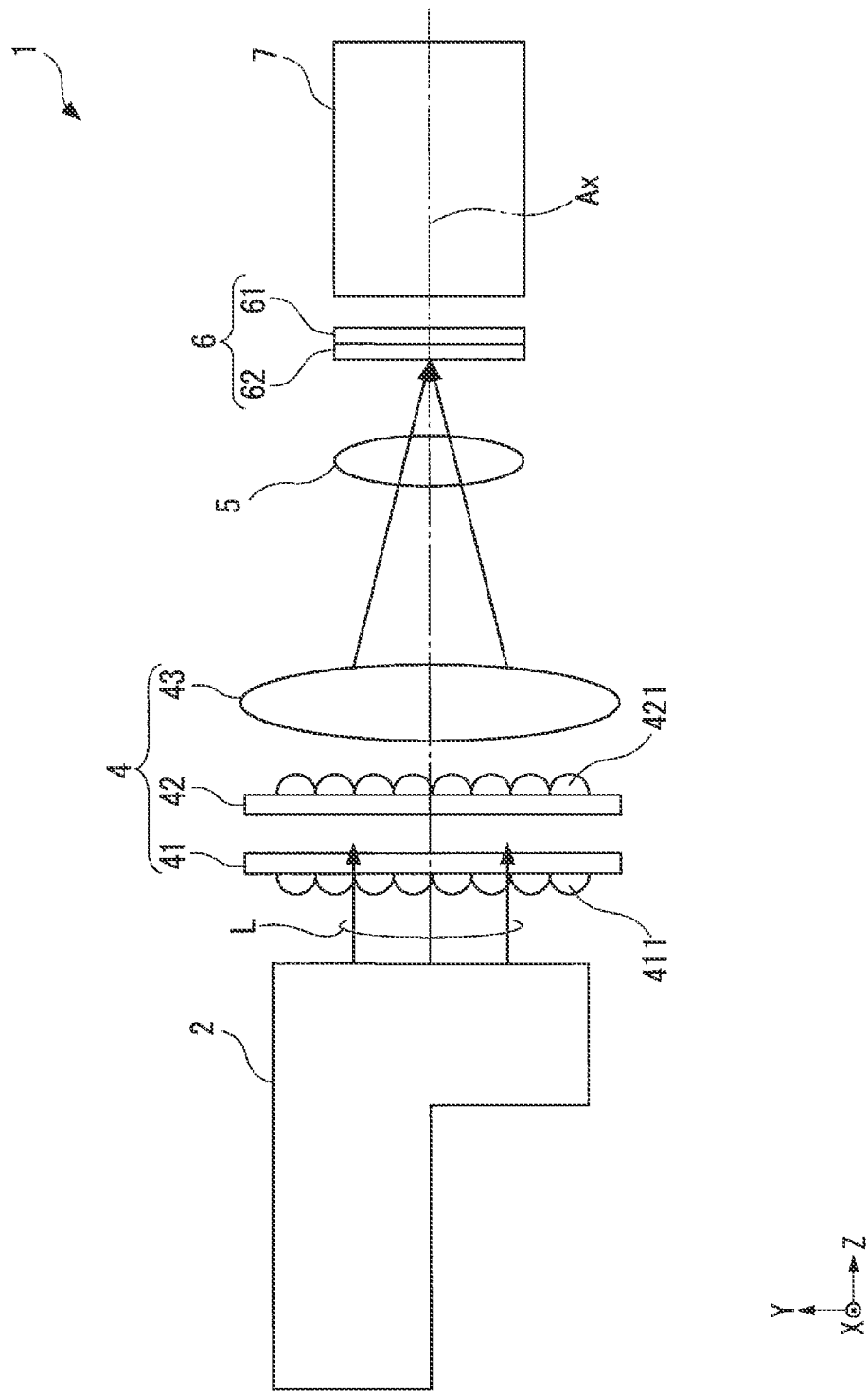
FIG. 1 is a schematic configuration diagram of a projector according to a first embodiment.

FIG. 1 is a schematic configuration diagram of a projector 1 according to the present embodiment.

It should be noted that in each of the drawings described below, the constituents are shown with the scale ratios of respective sizes set differently between the constituents in some cases in order to facilitate the visualization of each of the constituents.

The projector 1 according to the present embodiment modulates the light emitted from a light source device 2 to form an image corresponding to image information, and then projects the image thus formed on a projection target surface such as a screen in an enlarged manner. In other words, the projector 1 modulates the light emitted from the light source device 2 with a single light modulation device 6 including a single liquid crystal panel 61 to thereby form the image, and then projects the image thus formed. The projector 1 is a so-called single-panel projector.

As shown in FIG. 1, the projector 1 is provided with a light source device 2, a homogenization device 4, a field lens 5, a light modulation device 6, and a projection optical device 7. The light source device 2, the homogenization device 4, the field lens 5, the light modulation device 6, and the projection optical device 7 are disposed at predetermined positions along an illumination light axis Ax. The illumination light axis Ax is defined as an axis along the proceeding direction of the principal ray of the light L emitted from the light source 2.

The configuration of the light source device 2 and the homogenization device 4 will be described later in detail.

The field lens 5 is disposed between the homogenization device 4 and the light modulation device 6. The field lens 5 collimates the light L emitted from the homogenization device 4, and then guides the result to the light modulation device 6.

The projection optical device 7 projects the light modulated by the light modulation device 6, namely the light forming the image, on the projection target surface (not shown) such as a screen. The projection optical device 7 has a single projection lens or a plurality of projection lenses.

In the following description, the axis parallel to the proceeding direction of the light emitted from the light source device 2 along the illumination light axis Ax is defined as a Z axis, and the proceeding direction of the light is defined as a +Z direction. Further, two axes each perpendicular to the Z axis and perpendicular to each other are defined as an X axis and a Y axis. Out of the directions along these axes, an upper side in the vertical direction in the space in which the projector 1 is installed is defined as a +Y direction. Further, the right side in the horizontal direction when viewing an object which the light enters along the +Z direction so that the +Y direction points the upper side in the vertical direction is defined as a +X direction. Although not shown in the drawings, an opposite direction to the +X direction is defined as a −X direction, an opposite direction to the +Y direction is defined as a −Y direction, and an opposite direction to the +Z direction is defined as a −Z direction.

The +X direction in the present embodiment corresponds to a first direction in the appended claims, and the −Z direction in the present embodiment corresponds to a second direction in the appended claims. Further, the +Z direction in the present embodiment corresponds to a third direction in the appended claims, and the −X direction in the present embodiment corresponds to a fourth direction in the appended claims.

Configuration of Light Source Device

Figure 2:
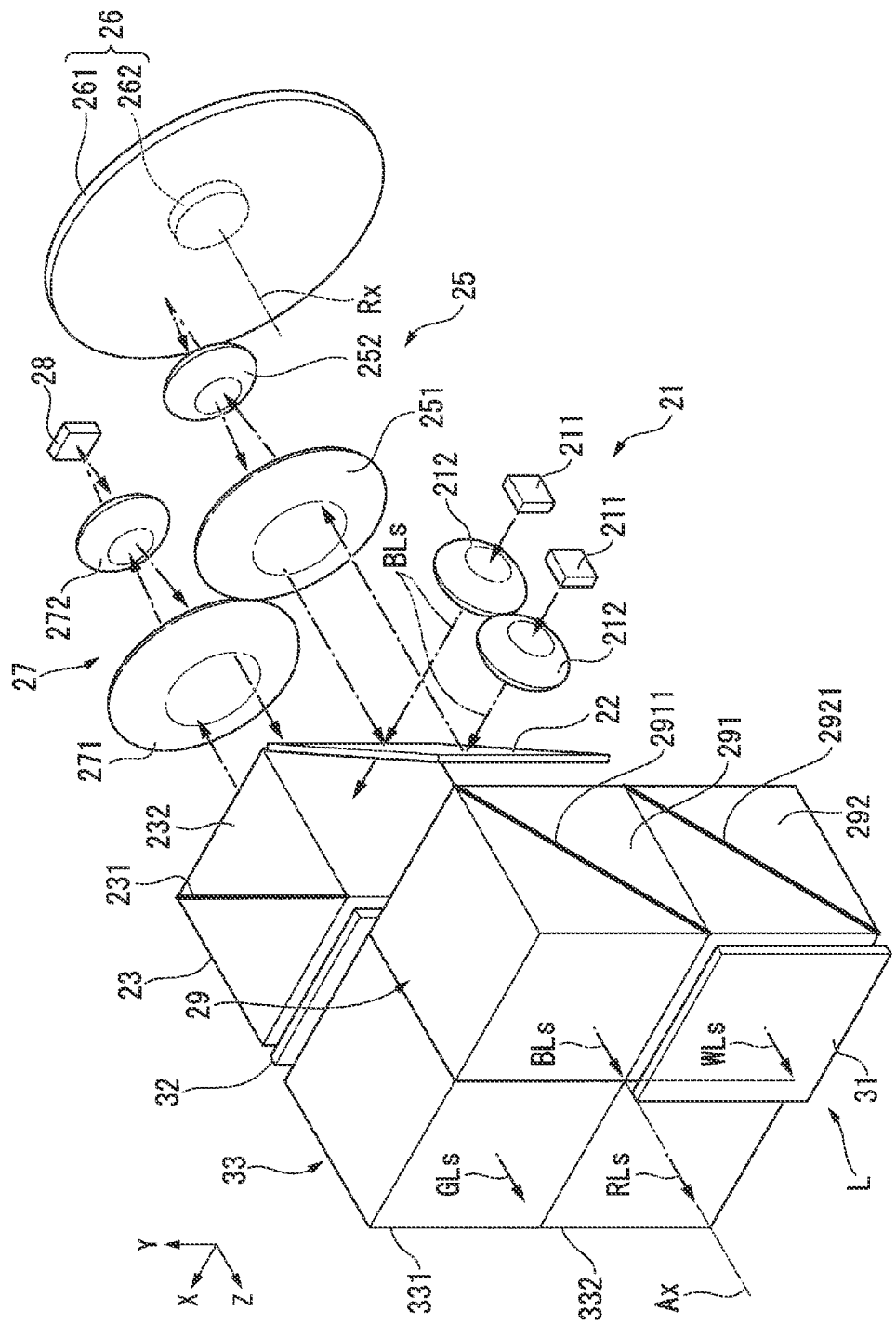
FIG. 2 is a perspective view of a light source device according to the first embodiment.
Figure 3:
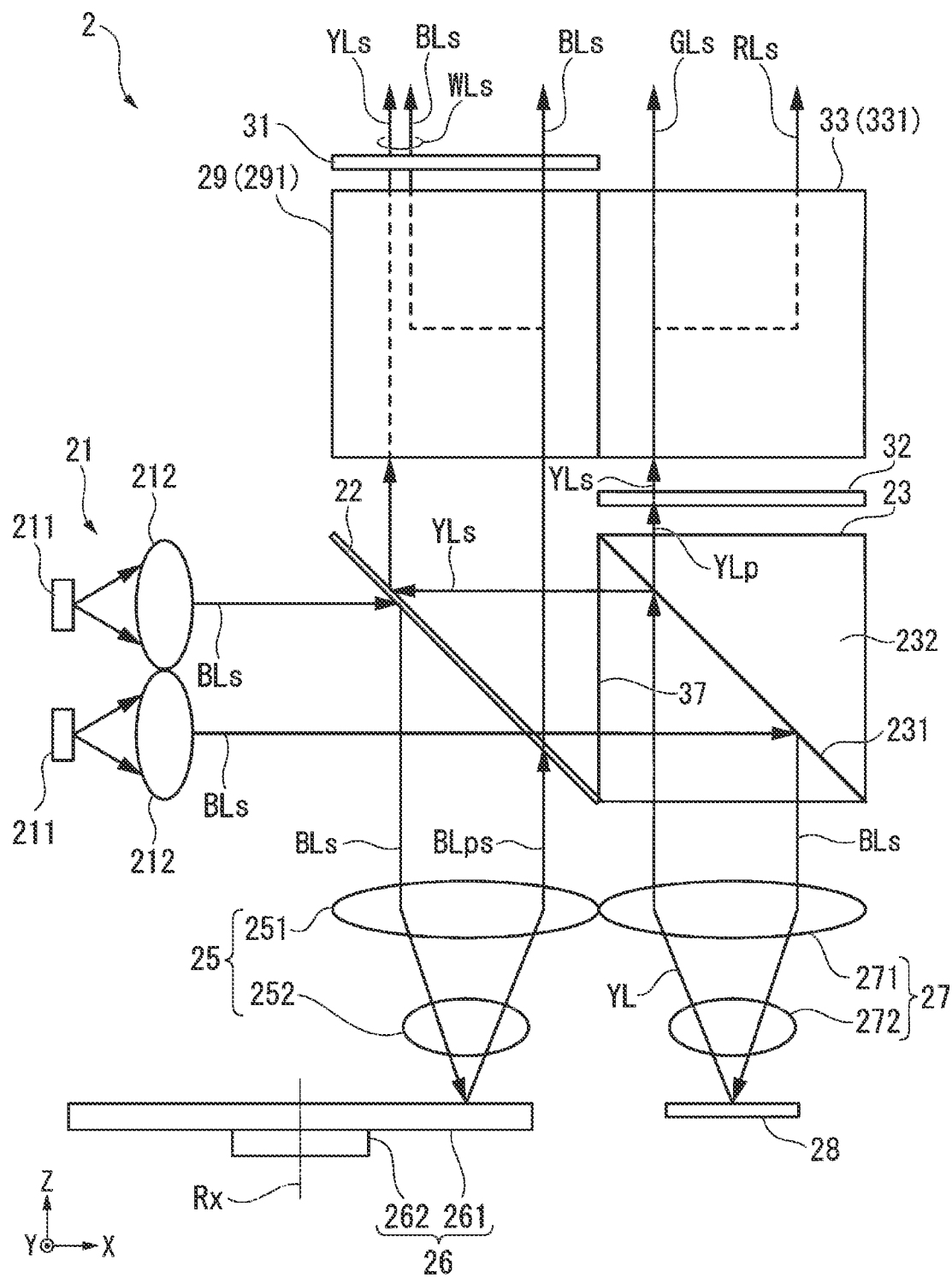
FIG. 3 is a plan view of the light source device viewed from a +Y direction.

FIG. 2 is a perspective view of the light source device 2 according to the present embodiment. FIG. 3 is a plan view of the light source device 2 viewed from the +Y direction.

As shown in FIG. 2 and FIG. 3, the light source device 2 emits the light L illuminating the light modulation device 6 toward a direction parallel to the illumination light axis Ax, namely the +Z direction. The light L emitted by the light source device 2 includes a plurality of colored light beams which are linearly polarized light beams having a uniform polarization direction, and are spatially separated from each other. In the present embodiment, the light L emitted by the light source device 2 consists of four light beams each formed of S-polarized light. The four light beams correspond to a blue light beam BLs, a white light beam WLs, a green light beam GLs, and a red light beam RLs.

The light source device 2 is provided with a light source section 21, a first light separation element 22, a second light separation element 23, a first light collection element 25, a diffusion device 26, a second light collection element 27, a wavelength conversion element 28, a first color separation element 29, a wavelength-selective retardation element 31, a first retardation element 32, and a second color separation element 33.

It should be noted that a P-polarization component in the present embodiment corresponds to a first polarization component in the appended claims, and an S-polarization component corresponds to a second polarization component in the appended claims. Further, as described later, the orientation of a film for separating the polarization components or the colored light beams is different between a group consisting of the first light separation element 22 and the second light separation element 23, and a group consisting of the first color separation element 29 and the second color separation element 33. Therefore, the descriptions of P-polarization component and S-polarization component represent the polarization direction with respect to the first light separation element 22 and the second light separation element 23, and are reversed in the polarization direction with respect to the first color separation element 29 and the second color separation element 33. Specifically, the P-polarization component with respect to the first light separation element 22 and the second light separation element 23 corresponds to the S-polarization component with respect to the first color separation element 29 and the second color separation element 33, and the S-polarization component with respect to the first light separation element 22 and the second light separation element 23 corresponds to the P-polarization component with respect to the first color separation element 29 and the second color separation element 33. It should be noted that in order to prevent confusion in the explanation, the P-polarization component and the S-polarization component are described as the polarization directions with respect to the first light separation element 22 and the second light separation element 23.

Configuration of Light Source Section

The light source section 21 emits the blue light beams BLs which enter the first light separation element 22 along the +X direction. The light source section 21 has a plurality of light emitting elements 211, and a plurality of collimator lenses 212. The light emitting elements 211 are each formed of a solid-state light source for emitting the blue light beam BLs. Specifically, the light emitting elements 211 are each formed of a semiconductor laser for emitting the blue light beam BLs as the S-polarization component. The blue light beam BLs is a laser beam having a blue wavelength band of, for example, 440 through 480 nm, and having a peak wavelength within a range of, for example, 450 through 460 nm. In other words, the light source section 21 emits the blue light beams BLs having the blue wavelength band.

The blue light beam BLs having the blue wavelength band in the present embodiment corresponds to first light having a first wavelength band in the appended claims.

In the case of the present embodiment, the plurality of light emitting elements 211 is arranged along the Z axis. Although the light source section 21 in the present embodiment has two light emitting elements 211, the number of the light emitting elements 211 is not limited, but the number of the light emitting elements 211 can be one. Further, the arrangement of the plurality of light emitting elements 211 is not limited as well. Further, the light emitting elements 211 are each arranged so as to emit the blue light beam BLs as the S-polarization component, but can be arranged so as to emit the blue light beam BLs as the P-polarization component. Further, it is possible to arrange some of the light emitting elements 211 so as to emit the blue light beam BLs as the S-polarization component, and other some of the light emitting elements 211 so as to emit the blue light beam BLs as the P-polarization component. In other words, it is possible for some of the light emitting elements 211 to rotate 90° centering on the exit light axis with respect to other some of the light emitting elements 211. Further, it is also possible for the light source element 211 to be formed of another solid-state light source such as LED (Light Emitting Diode) instead of the semiconductor laser.

The plurality of collimator lenses 212 is disposed between the plurality of light emitting elements 211 and the first light separation element 22. The collimator lenses 212 are disposed so as to correspond one-to-one to the light emitting elements 211. The collimator lens 212 collimates the light L emitted from the light emitting element 211.

Configuration of First Light Separation Element

The blue light beams BLs as the S-polarization component emitted from the light source section 21 enter the first light separation element 22 along the +X direction. In the first light separation element 22 in the present embodiment, the whole of the area of incidence of the blue light beams BLs is formed of a mirror having a characteristic of transmitting a part of the blue light beams BLs irrespective of the polarization component, reflecting another part of the blue light beams BLs irrespective of the polarization component, and reflecting the yellow light beam YL. The first light separation element 22 is a plate type light separation element.

Figure 6:
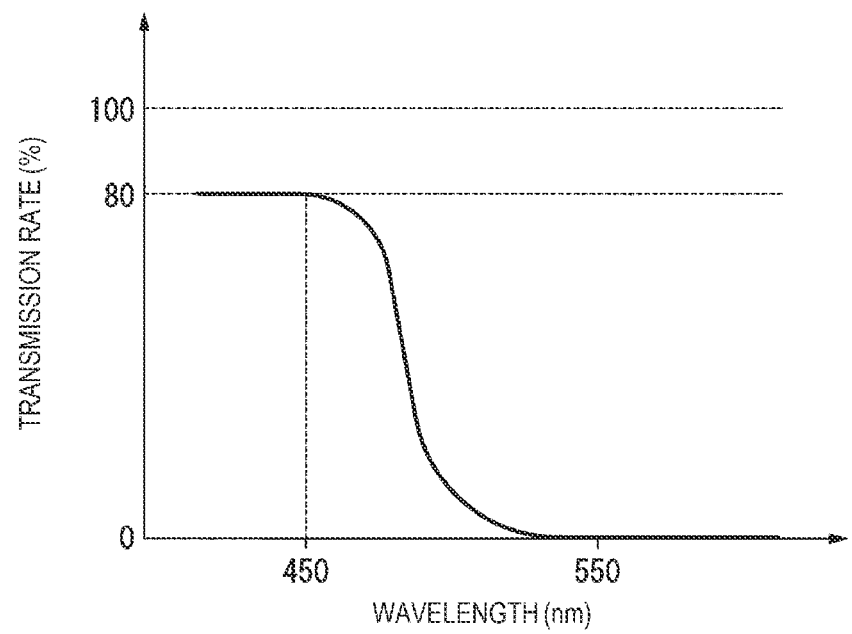
FIG. 6 is a diagram showing a light transmission rate characteristic of a first light separation element.

FIG. 6 is a diagram showing the light transmission rate characteristic of the first light separation element 22. In FIG. 6, the horizontal axis represents the wavelength (nm), and the vertical axis represents the transmission rate (%).

As a specific example, as shown in FIG. 6, the first light separation element 22 transmits 80% of the blue light beam BLs having the wavelength of 450 nm, and reflects 20% of the blue light beam BLs. Further, the transmission rate of the light having the wavelength no shorter than about 500 nm such as the yellow light beam YL having the wavelength of 550 nm is about 0%. In other words, the first light separation element 22 reflects the yellow light beam YL having the wavelength no shorter than about 500 nm.

The first light separation element 22 is tilted 45° with respect to the X axis and the Z axis. In other words, the first light separation element 22 is tilted 45° with respect to the X-Y plane and the Y-Z plane. Therefore, the first light separation element 22 transmits a part of the blue light beams BLs entering the first light separation element 22 from the light source section 21 along the +X direction, for example, 80% of the blue light beams BLs toward the +X direction irrespective of the polarization component, and reflects another part of the blue light beams BLs, for example, 20% of the blue light beam BLs toward the −Z direction irrespective of the polarization component. It should be noted that since the transmission/reflection characteristics of the first light separation element 22 do not depend on the polarization component, even when the blue light beams BLp as the P-polarization component are emitted from the light source section 21 unlike the present embodiment, the first light separation element 22 transmits a part of the blue light beams BLp toward the +X direction, and reflects another part of the blue light beams BLp toward the −Z direction. The same applies when the blue light beams having the P-polarization component and the S-polarization component mixed with each other are emitted from the light source section 21.

Configuration of Second Light Separation Element

The second light separation element 23 is disposed on the +X direction side of the first light separation element 22. The blue light beam BLs having been transmitted through the first light separation element 22 enters the second light separation element 23. The second light separation element 23 is formed of a prism type polarization split element. Specifically, the second light separation element 23 has a second polarization split layer 231, and two second base members 232 disposed across the second polarization split layer 231.

Specifically, each of the two second base members 232 has a substantially isosceles right triangular prismatic shape. The two second base members 232 are combined so that the tilted surfaces are opposed to each other, and are formed to have a substantially rectangular solid shape as a whole. The second polarization split layer 231 is disposed between the tilted surfaces of the two second base members 232. The second polarization split layer 231 is tilted 45° with respect to the X axis and the Z axis. In other words, the second polarization split layer 231 is tilted 45° with respect to the X-Y plane and the Y-Z plane. Further, the second polarization split layer 231 and the first light separation element 22 are disposed in parallel to each other.

The second polarization split layer 231 has a wavelength-selective polarization split characteristic of reflecting the blue light beam, and at the same time, reflecting the S-polarized light and transmitting the P-polarized light with respect to the light having a wavelength band longer than the blue wavelength band, namely the yellow light beam. Therefore, the second light separation element 23 reflects the blue light beam BLs which enters the second light separation element 23 from the first light separation element 22 toward the −Z direction. The second polarization split layer 231 is formed of, for example, a dielectric multilayer film. Further, the second base members 232 are each formed of general optical glass.

Configuration of First Light Collection Element

The first light collection element 25 is disposed on the −Z direction side of the first light separation element 22. In other words, the first light collection element 25 is disposed between the first light separation element 22 and the diffusion device 26 on the Z axis. The first light collection element 25 converges the blue light beam BLs entering the first light collection element 25 from the first light separation element 22 on a diffusion plate 261 of the diffusion device 26. Further, the first light collection element 25 collimates the blue light beam BLps described later entering the first light collection element 25 from the diffusion device 26. It should be noted that although in the example shown in FIG. 2 and FIG. 3, the first light collection element 25 is constituted by a first lens 251 and a second lens 252, the number of lenses constituting the first light collection element 25 is not limited.

Configuration of Diffusion Device

The diffusion device 26 is disposed on the −Z direction side of the first light collection element 25. In other words, the diffusion device 26 is disposed at the −Z direction side of the first light separation element 22. The diffusion device 26 reflects the blue light beam BLs entering the diffusion device 26 from the first light collection element 25 in the −Z direction toward the +Z direction while diffusing the blue light beam BLs so as to have an equivalent diffusion angle to that of the yellow light beam YL emitted from the wavelength conversion element 28 described later. The diffusion device 26 is provided with a diffusion plate 261 and a rotation device 262. The diffusion plate 261 preferably has a reflection characteristic as close to the Lambertian scattering as possible, and reflects the blue light beam BLs having entered the diffusion plate 261 in a wide-angle manner. The rotation device 262 is formed of a motor and so on, and rotates the diffusion plate 261 centering on a rotational axis Rx parallel to the +Z direction.

The diffusion plate 261 in the present embodiment corresponds to a diffusion element in the appended claims.

The blue light beam BLs having entered the diffusion plate 261 is partially disturbed in polarization state when being reflected by the diffusion plate 261 to thereby be converted into the blue light as unpolarized light, namely the blue light beam BLps including the P-polarization component and the S-polarization component. The blue light beam BLps emitted from the diffusion device 26 passes the first light collection element 25 toward the +Z direction, and then enters the first light separation element 22. The first light separation element 22 transmits a part of the blue light beam BLps including the P-polarization component and the S-polarization component, for example, 80, of the blue light beam BLps, and reflects 20% of the blue light beam BLps.

Configuration of Second Light Collection Element

The second light collection element 27 is disposed on the −Z direction side of the second light separation element 23. In other words, the second light collection element 27 is disposed between the second light separation element 23 and the wavelength conversion element 28 on the Z axis. The second light collection element 27 converges the blue light beam BLs reflected by the second light separation element 23 on the wavelength conversion element 28. Further, the second light collection element 27 collimates the yellow light beam YL which is emitted from the wavelength conversion element and is described later, and then emits the result toward the second light separation element 23. It should be noted that although in the example shown in FIG. 2 and FIG. 3, the second light collection element 27 is constituted by a first lens 271 and a second lens 272, the number of lenses constituting the second light collection element 27 is not limited.

Configuration of Wavelength Conversion Element

The wavelength conversion element 28 is disposed on the −Z direction side of the second light collection element 27. In other words, the wavelength conversion element 28 is disposed at the −Z direction side of the second light separation element 23. The wavelength conversion element 28 is a reflective wavelength conversion element which is excited by the light entering the wavelength conversion element 28, and emits the light different in wavelength from the light having entered the wavelength conversion element 28 toward an opposite direction to the incident direction of the light. In other words, the wavelength conversion element 28 converts the incident light, and then emits the light thus converted in wavelength toward the opposite direction to the incident direction of the light.

In the present embodiment, the wavelength conversion element 28 includes a yellow phosphor which is excited by blue light and emits yellow light. Specifically, the wavelength conversion element 28 includes, for example, an yttrium aluminum garnet (YAG) type phosphor containing cerium (Ce) as an activator agent. The wavelength conversion element 28 emits fluorescence having a yellow wavelength band longer than the blue wavelength band of the blue light beam BLs entering the wavelength conversion element 28 along the −Z direction, namely the yellow light beam YL as unpolarized light, toward the +Z direction. The yellow light beam YL has a wavelength band of, for example, 500 through 700 nm. The yellow light beam YL is light which includes a green light component and a red light component, and in which the S-polarization component and the P-polarization component are mixed with each other in each of the colored light components.

The fluorescence having the yellow wavelength band in the present embodiment, namely the yellow light beam YL as the unpolarized light, corresponds to second light having a second wavelength band in the appended claims.

The yellow light beam YL emitted from the wavelength conversion element 28 is transmitted by the second light collection element 27 toward the +Z direction to thereby be collimated, and then enters the second light separation element 23. Although the wavelength conversion element 28 in the present embodiment is a stationary wavelength conversion element, instead of this configuration, it is possible to use a rotary wavelength conversion element provided with a rotation device for rotating the wavelength conversion element 28 centering on a rotational axis parallel to the Z axis. In this case, the rise in temperature of the wavelength conversion element 28 is suppressed, and thus, it is possible to increase the wavelength conversion efficiency.

As described above, the second polarization split layer 231 of the second light separation element 23 has a polarization split property with respect to the light in the yellow wavelength band. Therefore, out of the yellow light beam YL as unpolarized light having entered the second polarization split layer 231, the yellow light beam YLs as the S-polarization component is reflected by the second polarization split layer 231 toward the −X direction, and then enters the first light separation element 22. Further, as described above, the first light separation element 22 has a characteristic of reflecting the yellow light beam YLs as the S-polarization component. Therefore, the yellow light beam YLs having entered the first light separation element 22 along the −X direction is reflected by the first light separation element 22 toward the +Z direction, and then enters the first color separation element 29.

Meanwhile, out of the yellow light beam YL as unpolarized light having entered the second polarization split layer 231, the yellow light beam YLp as the P-polarization component is transmitted through the second polarization split layer 231 toward the +Z direction to be emitted from the second light separation element 23, and then enters the first retardation element 32.

Configuration of First Color Separation Element

Figure 4:
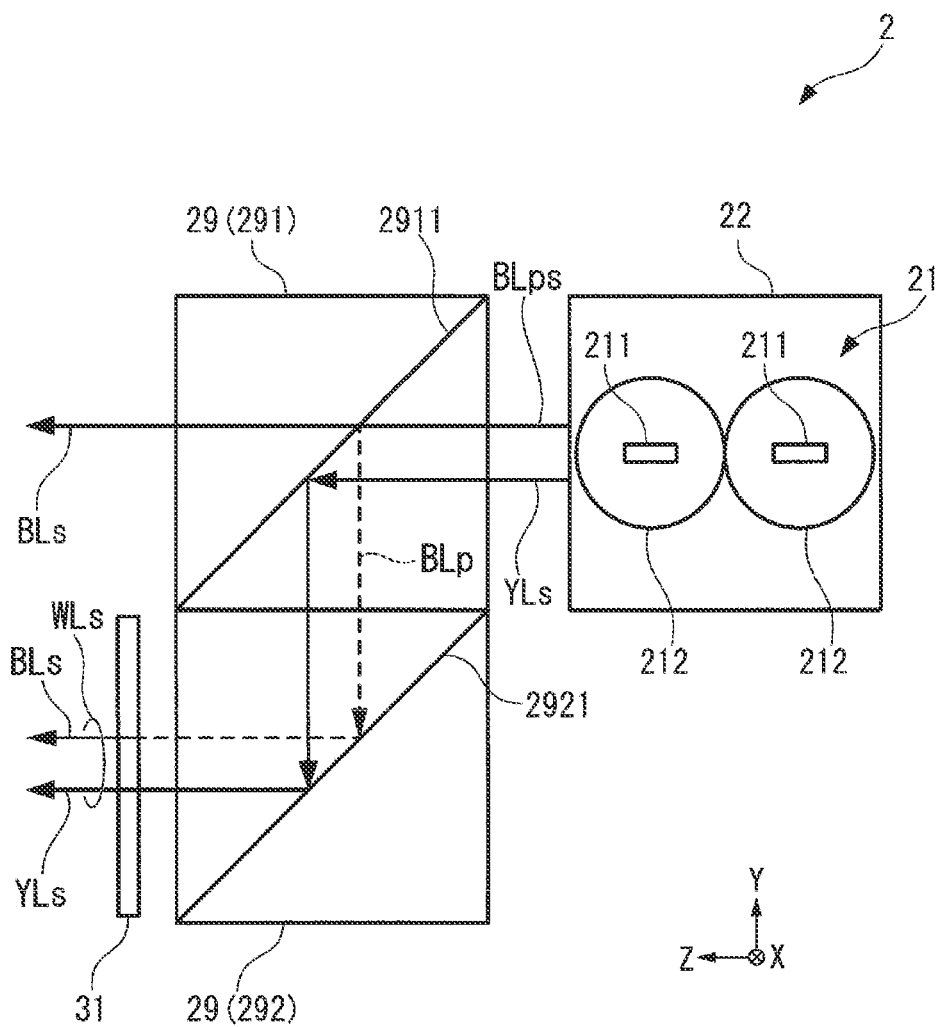
FIG. 4 is a side view of the light source device viewed from a −X direction.

FIG. 4 is a side view of the light source device 2 viewed from the −X direction. In other words, FIG. 4 shows the state of viewing the first color separation element 29 and the wavelength-selective retardation element 31 from the −X direction. In FIG. 4, the first light collection element 25, the diffusion device 26, and so on are omitted from the illustration.

As shown in FIG. 4, the first color separation element 29 is disposed on the +Z direction side of the first light separation element 22. The first color separation element 29 has a blue polarization split prism 291 and a reflecting prism 292. The blue polarization split prism 291 and the reflecting prism 292 are arranged side by side along the Y axis. The first color separation element 29 separates the light emitted from the first light separation element 22 toward the +Z direction into the blue light beam BLs and the white light beam WLs.

The blue light beam BLps and the yellow light beam YLs emitted from the first light separation element 22 enter the blue polarization split prism 291. The blue polarization split prism 291 is formed of a prism type polarization split element formed by combining two base members each having a substantially isosceles right triangular prismatic shape with each other to form a substantially rectangular solid shape. On the interface between the two base members, there is disposed a polarization split layer 2911. The polarization split layer 2911 is tilted 45° with respect to the Y axis and the Z axis. In other words, the polarization split layer 2911 is tilted 45° with respect to the X-Y plane and the X-Z plane.

The polarization split layer 2911 has a polarization split function with respect to the blue light out of the incident light, and thus, transmits the blue light as the S-polarization component while reflecting the blue light as the P-polarization component, but does not have the polarization split function with respect to the yellow light, and thus, reflects the yellow light. Therefore, out of the blue light beam BLps having entered the blue polarization split prism 291 from the first light separation element 22, the blue light beam BLs as the S-polarization component is transmitted through the polarization split layer 2911 toward the +Z direction, and is then emitted outside the blue polarization split prism 291.

The blue light beam BLs in the present embodiment corresponds to third light in the appended claims.

Meanwhile, the blue light beam BLp as the P-polarization component is reflected by the polarization split layer 2911 toward the −Y direction, and then enters the reflecting prism 292. Further, the yellow light beam YLs out of the light having entered the blue polarization split prism 291 from the first light separation element 22 is reflected by the polarization split layer 2911 toward the −Y direction, and then enters the reflecting prism 292.

The yellow light beam YLs in the present embodiment corresponds to fourth light in the appended claims.

The reflecting prism 292 is disposed at the −Y direction side of the blue polarization split prism 291. The reflecting prism 292 is a prism type reflecting element formed by combining two base members each having a substantially isosceles right triangular prismatic shape with each other to form a substantially rectangular solid shape. On the interface between the two base members, there is disposed a reflecting layer 2921. The reflecting layer 2921 is tilted 45° with respect to the +Y direction and the +Z direction. In other words, the reflecting layer 2921 is tilted 45° with respect to the X-Y plane and the X-Z plane. In other words, the reflecting layer 2921 and the polarization split layer 2911 are arranged in parallel to each other.

The blue light beam BLp and the yellow light beam YLs which enter the reflecting layer 2921 in the −Y direction from the blue polarization split prism 291 are reflected by the reflecting layer 2921 toward the +Z direction. The blue light beam BLp and the yellow light beam YLs reflected by the reflecting layer 2921 are emitted from the reflecting prism 292 toward the +Z direction. It should be noted that it is possible to adopt a reflecting mirror shaped like a plate and having the reflecting layer 2921 instead of the reflecting prism 292.

Configuration of Wavelength-Selective Retardation Element

The wavelength-selective retardation element 31 is disposed at the +Z direction side of the reflecting prism 292. In other words, the wavelength-selective retardation element 31 is disposed on the light path of the blue light beam BLp and the yellow light beam YLs emitted from the reflecting prism 292. The wavelength-selective retardation element 31 has a characteristic of providing the phase difference as much as a half of the blue wavelength band to the blue light, and not providing the phase difference to the light having a wavelength band other than the blue wavelength band, namely the yellow light. Specifically, as the wavelength-selective retardation element, it is possible to use ColorSelect® (trade name; product of ColorLink Inc.). The wavelength-selective retardation element 31 in the present embodiment corresponds to an optical element in the appended claims.

Thus, the wavelength-selective retardation element 31 provides only the light in the blue wavelength band with the half phase difference to rotate the polarization direction as much as 90°. In other words, the blue light beam BLp as the P-polarization component emitted from the reflecting prism 292 is transmitted through the wavelength-selective retardation element 31 to thereby be converted into the blue light beam BLs as the S-polarization component. In contrast, the yellow light beam YLs emitted from the reflecting prism 292 is transmitted through the wavelength-selective retardation element 31 without changing the polarization direction. Thus, the white light beam WLs including the blue light beam BLs and the yellow light beam YLs is emitted from the wavelength-selective retardation element 31.

In such a manner, the white light beam WLs is spatially separated from the blue light beam BLs, and is emitted from an exit position different from the exit position of the blue light beam BLs in the light source device 2, and then enters the homogenization device 4. In particular, the yellow light beam YLs is emitted from the exit position distant toward the −Y direction from the exit position of the blue light beam BLs in the light source device 2, and then enters the homogenization device 4.

Configuration of First Retardation Element

Figure 5:
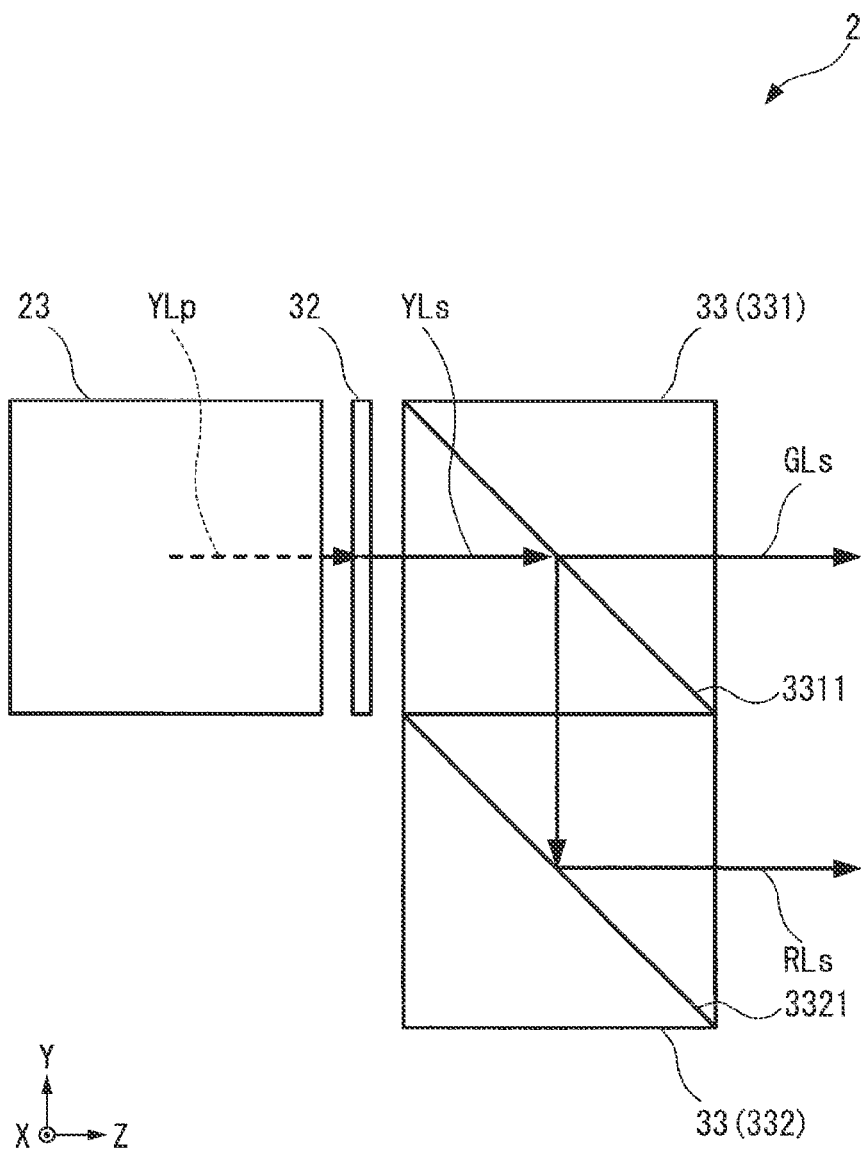
FIG. 5 is a side view of the light source device viewed from a +X direction.

FIG. 5 is a side view of the light source device 2 viewed from the +X direction. In other words, FIG. 5 shows the first retardation element 32 and the second color separation element 33 viewed from the +X direction. It should be noted that in FIG. 5, the second light collection element 27 and the wavelength conversion element 28 are omitted from the illustration.

As shown in FIG. 3 and FIG. 5, the first retardation element 32 is disposed at the +Z direction side of the second light separation element 23. The yellow light beam YLp having been transmitted through the second light separation element 23 enters the first retardation element 32. The first retardation element 32 is formed of a ½ wave plate with respect to the yellow wavelength band of the yellow light beam YLp. The first retardation element 32 converts the yellow light beam YLp as the P-polarization component into the yellow light beam YLs as the S-polarization component. The yellow light beam YLs obtained by the conversion into the S-polarization component enters the second color separation element 33.

Configuration of Second Color Separation Element

As shown in FIG. 5, the second color separation element 33 is disposed at the +Z direction side of the first retardation element 32. In other words, the second color separation element 33 is disposed at the +Z direction side of the second light separation element 23. The second color separation element 33 has a dichroic prism 331 and a reflecting prism 332. The dichroic prism 331 and the reflecting prism 332 are arranged side by side along the Y axis. The yellow light beam YLs which has been emitted from the second light separation element 23, and then converted by the first retardation element 32 into the S-polarization component is separated by the second color separation element 33 into the green light beam GLs and the red light beam RLs.

The dichroic prism 331 is formed of a prism type color separation element. On the interface between two base members, there is disposed a color separation layer 3311. The color separation layer 3311 is tilted 45° with respect to the +Y direction and the +Z direction. In other words, the color separation layer 3311 is tilted 45° with respect to the X-Y plane and the X-Z plane. The color separation layer 3311 and the reflecting layer 3321 are arranged in parallel to each other.

The color separation layer 3311 is formed of a dichroic mirror for transmitting the green light component of the incident light, and reflecting the red light component thereof. Therefore, the green light beam GLs as the S-polarized light out of the yellow light beam YLs having entered the dichroic prism 331 is transmitted through the color separation layer 3311 toward the +Z direction to be emitted outside the dichroic prism 331. The green light beam GLs as the S-polarized light is emitted from the light source device 2 toward the +Z direction, and then enters the homogenization device 4. In other words, the green light beam GLs is spatially separated from the blue light beam BLs and the white light beam WLs, and is emitted from an exit position different from the exit positions of the blue light beam BLs and the white light beam WLs, and then enters the homogenization device 4. In other words, the green light beam GLs is emitted from the exit position distant toward the +X direction from the exit position of the blue light beam BLs in the light source device 2, and then enters the homogenization device 4.

In contrast, the red light beam RLs as the S-polarization component out of the yellow light beam YLs having entered the dichroic prism 331 is reflected toward the −Y direction by the color separation layer 3311. It should be noted that it is possible to use a plate type dichroic mirror having the color separation layer 3311 instead of the dichroic prism 331.

The reflecting prism 332 has substantially the same configuration as the reflecting prism 292. Specifically, the reflecting prism 332 has a reflecting layer 3321 which is parallel to the polarization split layer 2911, the color separation layer 3311, and the reflecting layer 2921.

The red light beam RLs which is reflected by the color separation layer 3311, and then enters the reflecting layer 3321 is reflected by the reflecting layer 3321 toward the +Z direction. The red light beam RLs having been reflected by the reflecting layer 3321 is emitted outside the reflecting prism 332. The red light beam RLs is emitted from the light source device 2 toward the +Z direction, and then enters the homogenization device 4. In other words, the red light beam RLs is spatially separated from the blue light beam BLs, the white light beam WLs, and the green light beam GLs, and is emitted from an exit position different from the exit positions of the blue light beam BLs, the white light beam WLs, and the green light beam GLs, and then enters the homogenization device 4. In other words, the red light beam RLs is emitted from the exit position which is distant toward the −Y direction from the exit position of the green light beam GLs in the light source device 2, and is distant toward the +X direction from the exit position of the white light beam WLs, and then enters the homogenization device 4.

Configuration of Homogenization Device

As shown in FIG. 1, the homogenization device 4 homogenizes the illuminance in the image formation area of the light modulation device 6 irradiated with the light beams emitted from the light source device 2. The homogenization device 4 has a first multi-lens 41, a second multi-lens 42, and a superimposing lens 43.

The first multi-lens 41 has a plurality of lenses 411 arranged in a matrix in a plane perpendicular to a central axis of the light L entering the first multi-lens 41 from the light source device 2, namely the illumination light axis Ax. The first multi-lens 41 divides the light entering the first multi-lens 41 from the light source device 2 into a plurality of partial light beams with the plurality of lenses 411.

Figure 7:
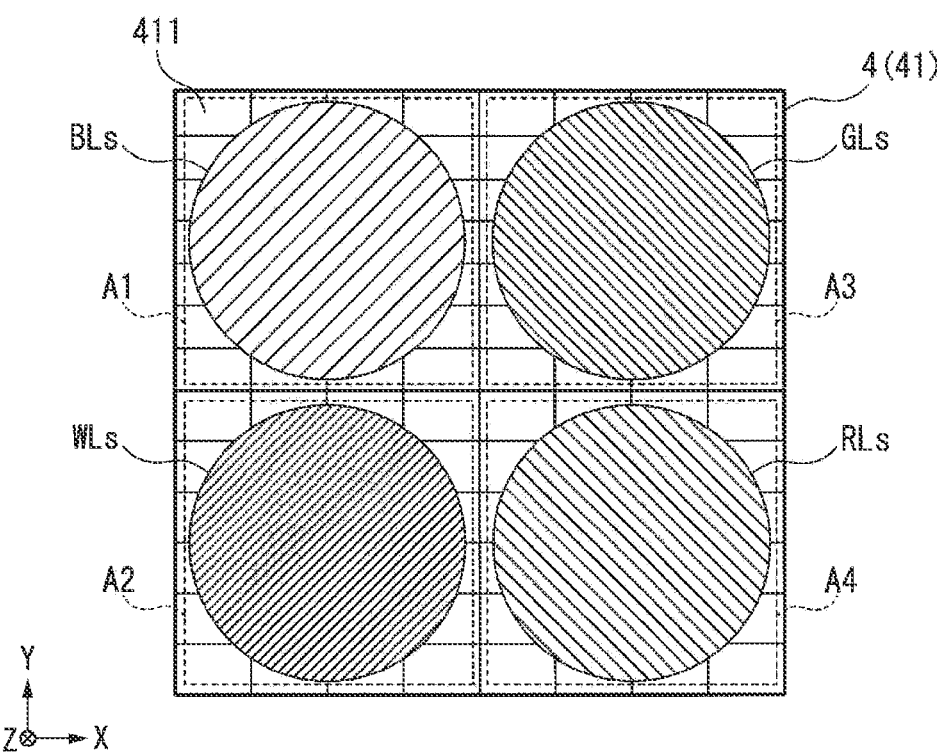
FIG. 7 is a schematic diagram showing positions of incidence of colored light beams on a multi-lens.

FIG. 7 is a schematic diagram showing positions of incidence of the respective colored light beams in the first multi-lens 41 viewed from the −Z direction.

As shown in FIG. 7, the blue light beam BLs, the white light beam WLs, the green light beam GLs, and the red light beam RLs emitted from the light source device 2 enter the first multi-lens 41. The blue light beam BLs emitted from the position at the −X direction side and at the +Y direction side in the light source device 2 enters a plurality of lenses 411 included in an area A1 located at the −X direction side and at the +Y direction side in the first multi-lens 41. Further, the white light beam WLs emitted from the position at the −X direction side and at the −Y direction side in the light source device 2 enters a plurality of lenses 411 included in an area A2 located at the −X direction side and at the −Y direction side in the first multi-lens 41.

The green light beam GLs emitted from the position at the +X direction side and at the +Y direction side in the light source device 2 enters a plurality of lenses 411 included in an area A3 located at the +X direction side and at the +Y direction side in the first multi-lens 41. The red light beam RLs emitted from the position at the +X direction side and at the −Y direction side in the light source device 2 enters a plurality of lenses 411 included in an area A4 located at the +X direction side and at the −Y direction side in the first multi-lens 41. Each of the colored light beams having entered the lenses 411 turns to a plurality of partial light beams, and enters lenses 421 corresponding respectively to the lenses 411 in the second multi-lens 42.

Out of the light L emitted from the light source device 2 in the present embodiment, the blue light beam BLs corresponds to the third light in the appended claims, the white light beam WLs corresponds to the fourth light in the appended claims, the green light beam GLs corresponds to fifth light in the appended claims, and the red light beam RLs corresponds to sixth light in the appended claims.

As shown in FIG. 1, the second multi-lens 42 has the plurality of lenses 421 which is arranged in a matrix in a plane perpendicular to the illumination light axis Ax, and at the same time, corresponds respectively to the plurality of lenses 411 of the first multi-lens 41. The plurality of partial light beams emitted from the lenses 411 corresponding respectively to the lenses 421 enters the respective lenses 421. Each of the lenses 421 makes the partial light beam having entered the lens 421 enter the superimposing lens 43.

The superimposing lens 43 superimposes the plurality of partial light beams entering the superimposing lens 43 from the second multi-lens 42 on each other in the image formation area of the light modulation device 6. In particular, the second multi-lens 42 and the superimposing lens 43 make the blue light beam BLs, the white light beam WLs, the green light beam GLs, and the red light beam RLs each divided into the plurality of partial light beams enter a plurality of microlenses 621 constituting a microlens array 62 described later of the light modulation device 6 at respective angles different from each other via the field lens 5.

Configuration of Light Modulation Device

As shown in FIG. 1, the light modulation device 6 modulates the light emitted from the light source device 2. In particular, the light modulation device 6 modulates each of the colored light beams which are emitted from the light source device 2, and then enter the light modulation device 6 via the homogenization device 4 and the field lens 5 in accordance with image information to form the image light corresponding to the image information. The light modulation device 6 is provided with the single liquid crystal panel 61 and a single microlens array 62.

Configuration of Liquid Crystal Panel

Figure 8:
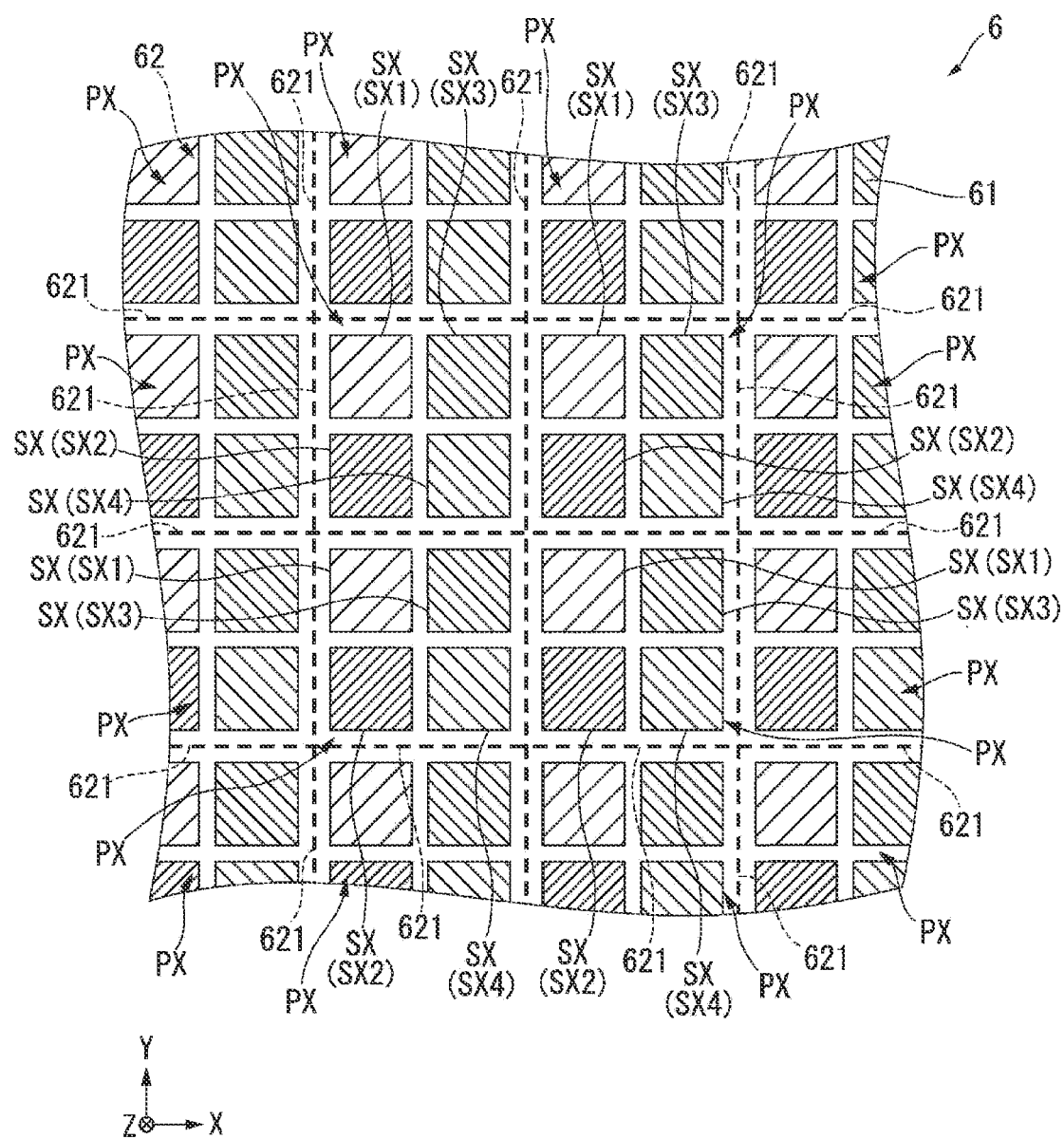
FIG. 8 is an enlarged view of a light modulation device.

FIG. 8 is a schematic diagram of a part of the light modulation device 6 viewed in an enlarged manner from the −Z direction. In other words, FIG. 8 shows a correspondence relationship between the pixels PX provided to the liquid crystal panel 61 and the microlenses 621 provided to the microlens array 62.

As shown in FIG. 8, the liquid crystal panel 61 has the plurality of pixels PX arranged in a matrix in a plane perpendicular to the illumination light axis Ax.

Each of the pixels PX has a plurality of sub-pixels SX for respectively modulating colored light beams different in color from each other. In the present embodiment, each of the pixels PX has four sub-pixels SX (SX1 through SX4). Specifically, in one pixel PX, the first sub-pixel SX1 is disposed at a position on the −X direction side and at the +Y direction side. The second sub-pixel SX2 is disposed at a position at the −X direction side and at the −Y direction side. The third sub-pixel SX3 is disposed at a position at the +X direction side and at the +Y direction side. The fourth sub-pixel SX4 is disposed at a position at the +X direction side and at the −Y direction side.

Configuration of Microlens Array

As shown in FIG. 1, the microlens array 62 is disposed at the −Z direction side as the side of incidence of light with respect to the liquid crystal panel 61. The microlens array 62 guides the colored light beams entering the microlens array 62 to the individual pixels PX. The microlens array 62 has the plurality of microlenses 621 corresponding to the plurality of pixels PX.

The plurality of microlenses 621 is arranged in a matrix in a plane perpendicular to the illumination light axis Ax. In other words, the plurality of microlenses 621 is arranged in a matrix in an orthogonal plane with respect to the central axis of the light entering the plurality of microlenses 621 from the field lens 5. In the present embodiment, one microlens 621 is disposed so as to correspond to the two sub-pixels arranged in the +X direction and the two sub-pixels arranged in the +Y direction. In other words, one microlens 621 is disposed so as to correspond to the four sub-pixels SX1 through SX4 arranged 2×2 in the X-Y plane.

The blue light beam BLs, the white light beam WLs, the green light beam GLs, and the red light beam RLs superimposed by the homogenization device 4 enter the microlenses 621 at respective angles different from each other. The microlenses 621 make the colored light beams entering the microlenses 621 enter the sub-pixels SX corresponding to the colored light beams. Specifically, the microlens 621 makes the blue light beam BLs enter the first sub-pixel SX1 out of the sub-pixels SX of the pixel PX corresponding to the microlens 621, makes the white light beam WLs enter the second sub-pixel SX2, makes the green light beam GLs enter the third sub-pixel SX3, and makes the red light beam RLs enter the fourth sub-pixel SX4. Thus, the colored light beams corresponding respectively to the sub-pixels SX1 through SX4 enter the respective sub-pixels SX1 through SX4, and the colored light beams are respectively modulated by the corresponding sub-pixels SX1 through SX4. In such a manner, the image light modulated by the liquid crystal panel 61 is projected by the projection optical device 7 on the projection target surface not shown.

Advantages of First Embodiment

In the related-art projector described in Document 1, the lamp is used as the light source. Since the light emitted from the lamp is not uniform in polarization direction, in order to use the liquid crystal panel as the light modulation device, a polarization conversion device for uniforming the polarization direction becomes necessary. For the projector, there is generally used the polarization conversion device provided with a multi-lens array and a polarization split element (PBS) array. However, in order to reduce the size of the projector, there are required the multi-lens array and the PBS array narrow in pitch, but it is extremely difficult to form the PBS array narrow in pitch.

To cope with this problem, in the present embodiment, the four colors of colored light beams uniform in the polarization direction, namely the blue light beam BLs as the S-polarization component, the white light beam WLs as the S-polarization component, the green light beam GLs as the S-polarization component, and the red light beam RLs as the S-polarization component, are emitted from the light source device 2. According to this configuration, it is possible to realize the light source device 2 capable of emitting the plurality of colored light beams spatially separated from each other and uniform in the polarization direction without using the polarization conversion element narrow in pitch described above. Thus, it is possible to reduce the light source device 2 in size, and by extension, it is possible to achieve reduction in size of the projector 1.

Further, in the projector 1 according to the present embodiment, since the white light beam WLs enters the light modulation device 6 in addition to the blue light beam BLs, the green light beam GLs, and the red light beam RLs, it is possible to increase the luminance of the image projected from the projection optical device 7.

Further, in the case of the present embodiment, since the first retardation element 32 is disposed between the second light separation element 23 and the second color separation element 33, it is possible to convert the yellow light beam YLp as the P-polarization component emitted from the second light separation element 23 into the yellow light beam YLs as the S-polarization component. As a result, the light beams as the S-polarization component can be used as the green light beam GLs and the red light beam RLs emitted from the second color separation element 33. Further, since the wavelength-selective retardation element 31 is disposed on the light path of the blue light beam BLp and the yellow light beam YLs emitted from the reflecting prism 292, it is possible to convert the blue light beam BLp as the P-polarization component into the blue light beam BLs as the S-polarization component, and it is possible to make the white light beam WLs by combining the blue light beam BLs thus obtained and the yellow light beam YLs as the S-polarization component. Thus, it is possible to make all of the blue light beam BLs, the white light beam WLs, the green light beam GLs, and the red light beam RLs emitted from the light source device 2 uniform in polarization component, namely the light beams as the S-polarization component.

Further, in the case of the present embodiment, since the light source device 2 is provided with the first light collection element 25 for converging the blue light beam BLs toward the diffusion device 26, it is possible to efficiently converge the blue light beam BLs emitted from the first light separation element 22 on the diffusion device 26 with the first light collection element 25, and at the same time, it is possible to collimate the blue light beam BLps emitted from the diffusion device 26. Thus, it is possible to suppress the loss of the blue light beams BLs, BLps to increase the use efficiency of the blue light beams.

Further, in the case of the present embodiment, since the light source device 2 is provided with the second light collection element 27 for converging the blue light beam BLs toward the wavelength conversion element 28, it is possible to efficiently converge the blue light beam BLs emitted from the second light separation element 23 on the wavelength conversion element 28 with the second light collection element 27, and at the same time, it is possible to collimate the yellow light beam YL emitted from the wavelength conversion element 28. Thus, it is possible to suppress the loss of the blue light beam BLs and the yellow light beam YL to increase the use efficiency of the blue light beam BLs and the yellow light YL.

Here, the light source device according to the comparative example described below is assumed.

Figure 9:
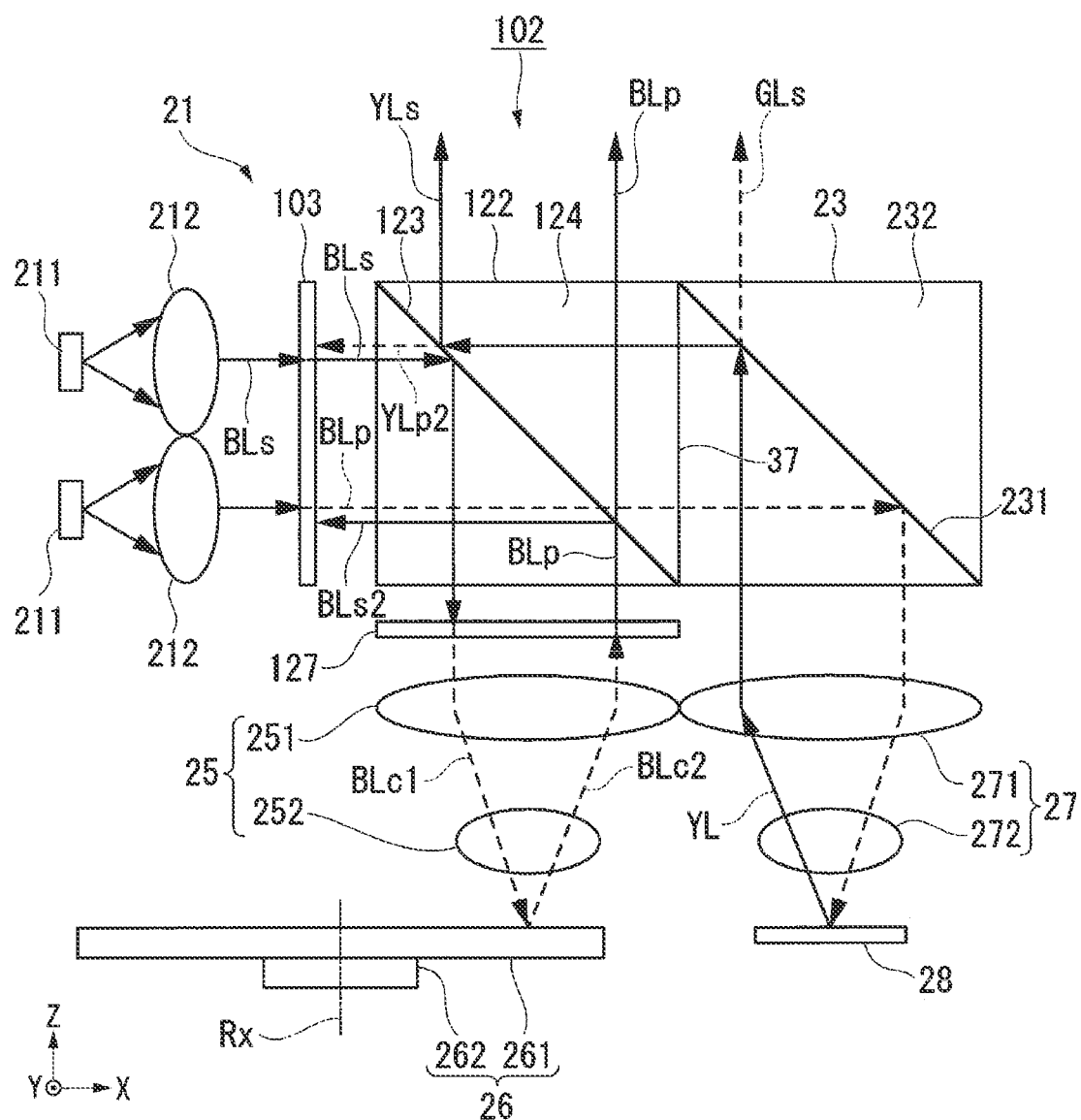
FIG. 9 is a plan view of a light source device in a comparative example viewed from the +Y direction.

FIG. 9 is a plan view of the light source device 102 according to the comparative example viewed from the +Y direction. It should be noted that in FIG. 9, constituents common to the light source device 2 according to the present embodiment are denoted by the same symbols. Further, in FIG. 9, the first color separation element 29 and the second color separation element 33 are omitted from the illustration.

As shown in FIG. 9, in the light source device 102 according to the comparative example, the light source section 21 has a retardation element 103. Thus, the blue light beams BLs emitted from the light emitting elements 211 are transmitted through the retardation element 103 to thereby be converted into the light including the blue light beam BLs as the S-polarization component and the blue light beam BLp as the P-polarization component. Further, a first light separation element 122 is formed of a prism type polarization split element. Therefore, the first light separation element 122 has a first polarization split layer 123, and first base members 124 disposed across the first polarization split layer 123. The first polarization split layer 123 has a polarization split characteristic of transmitting the P-polarization component and reflecting the S-polarization component, and therefore, transmits the blue light beam BLp to enter the second light separation element 23, at the same time, reflects the blue light beam BLs to enter a ¼ wave plate 127.

In the light source device 102 according to the comparative example, the blue light beam BLs emitted from the first light separation element 122, and then proceeding toward the diffusion device 26 is converted by the ¼ wave plate 127 into the blue light beam BLc1 as circularly polarized light, and is then reflected by the diffusion plate 261 to thereby be converted into the blue light beam BLc2 as circularly polarized light in a reverse rotational direction. The blue light beam BLc2 is converted by the ¼ wave plate 127 into the blue light beam BLp as the P-polarization component, and is then emitted from the first light separation element 122. The blue light beam BLp emitted from the first light separation element 122 and then proceeding toward the second light separation element 23 is reflected by the second polarization split layer 231 of the second light separation element 23, and then proceeds toward the wavelength conversion element 28. The behavior of the yellow light beam YL emitted from the wavelength conversion element 28 is substantially the same as in the embodiment described above.

The first base members 124 constituting the first light separation element 122 are each formed of a general optical glass made of borosilicate glass or the like represented by, for example, BK7. Similarly, the second base members 232 constituting the second light separation element 23 are each formed of general optical glass such as borosilicate glass. The rest of the configuration of the light source device 102 is substantially the same as that of the light source device 2 according to the first embodiment.

By being irradiated with the light from the light source section 21, the heat is generated inside the first light separation element 122 and the second light separation element 23. On this occasion, when the first base members 124 constituting the first light separation element 122 and the second base members 232 constituting the second light separation element 23 are formed of the general optical glass such as borosilicate glass, thermal strain occurs in the first base members 124 and the second base members 232, and birefringence due to the thermal strain occurs, and as a result, the polarization state of the light proceeding inside the first light separation element 122 and the second light separation element 23 is disturbed.

Specifically, a part of the blue light beam BLp as the P-polarization component which is emitted from the ¼ wave plate 127, enters the first light separation element 122, and then proceeds toward the first polarization split layer 123 changes to the blue light beam BLs2 as the S-polarization component. Subsequently, the blue light beam BLs2 is reflected by the first polarization split layer 123 toward the −X direction. Further, a part of the yellow light beam YLs as the S-polarization component which is reflected by the second polarization split layer 231, and then proceeds toward the first polarization split layer 123 changes to the yellow light beam YLp2 as the P-polarization component. Subsequently, the yellow light beam YLp2 is transmitted through the first polarization split layer 221 toward the −X direction.

The blue light beam BLs2 and the yellow light beam YLs2 described above are the light beams returning from the first light separation element 122 to the light source section 21, and thus, the light loss occurs. As described above, according to the light source device 102 related to the comparative example, since the loss of the blue light beam and the yellow light beam occurs, there is a possibility that the light use efficiency decreases.

To cope with this problem, in the light source device 2 according to the present embodiment, the first light separation element 22 has a characteristic of transmitting a part of the blue light beam while reflecting another part of the blue light beam irrespective of the polarization component, and reflecting the yellow light beam. In other words, the first light separation element 22 does not have a polarization split function of separating the light depending on the polarization component. Therefore, even when, for example, the birefringence due to the thermal strain of the second light separation element 23 occurs, and thus, the polarization state of the light changes, the loss of the blue light beam and the yellow light beam hardly occurs, and it is possible to suppress the decrease in light use efficiency.

Further, in the case of the present embodiment, since the projector 1 is provided with the homogenization device 4 located between the light source device 2 and the light modulation device 6, it is possible to substantially homogenously irradiate the light modulation device 6 with the blue light beam BLs, the white light beam WLs, the green light beam GLs, and the red light beam RLs emitted from the light source device 2. Thus, it is possible to suppress the color unevenness and the luminance unevenness in the projection image.

Further, in the case of the present embodiment, since the light modulation device 6 is provided with the microlens array 62 having the plurality of microlenses 621 corresponding to the plurality of pixels PX, it is possible to make the four colored light beams entering the light modulation device 6 enter the corresponding four sub-pixels SX of the liquid crystal panel 61 using the microlenses 621. Thus, it is possible to make the colored light beams emitted from the light source device 2 efficiently enter the respective sub-pixels SX, and thus, it is possible to increase the use efficiency of the colored light beams.

Second Embodiment

A second embodiment of the present disclosure will hereinafter be described using FIG. 10 through FIG. 12.

Since the basic configuration of a light source device according to the second embodiment is substantially the same as in the first embodiment, the overall description of the light source device will be omitted.

Figure 10:
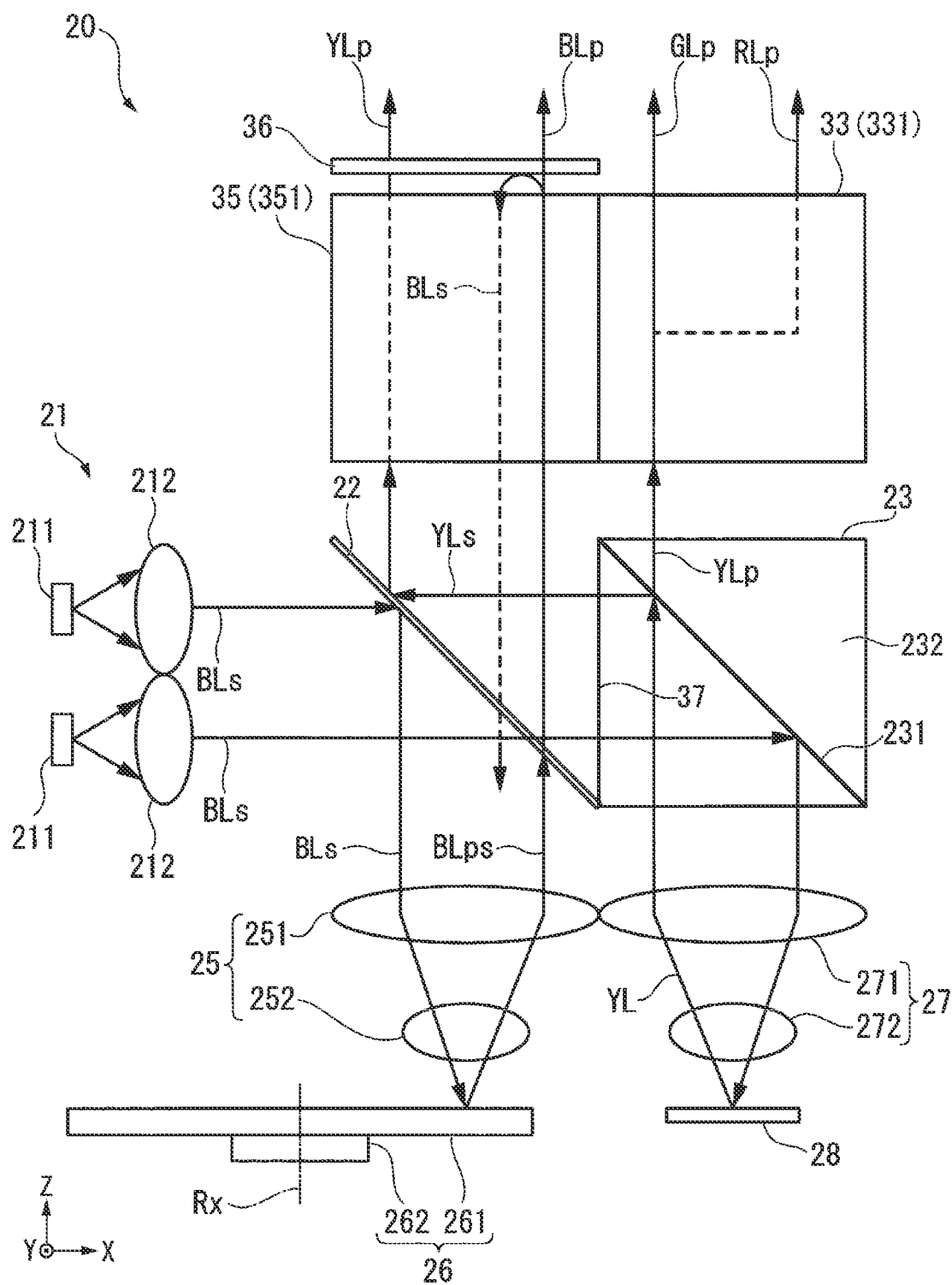
FIG. 10 is a plan view of a light source device according to a second embodiment viewed from the +Y direction.

FIG. 10 is a plan view of the light source device 20 according to the second embodiment viewed from the +Y direction. FIG. 11 is a side view of the light source device 20 viewed from the −X direction. FIG. 12 is a side view of the light source device 20 viewed from the +X direction. In FIG. 11, the first light collection element 25, the diffusion device 26, and so on are omitted from the illustration. In FIG. 12, the second light collection element 27 and the wavelength conversion element 28 are omitted from the illustration.

Figure 11:
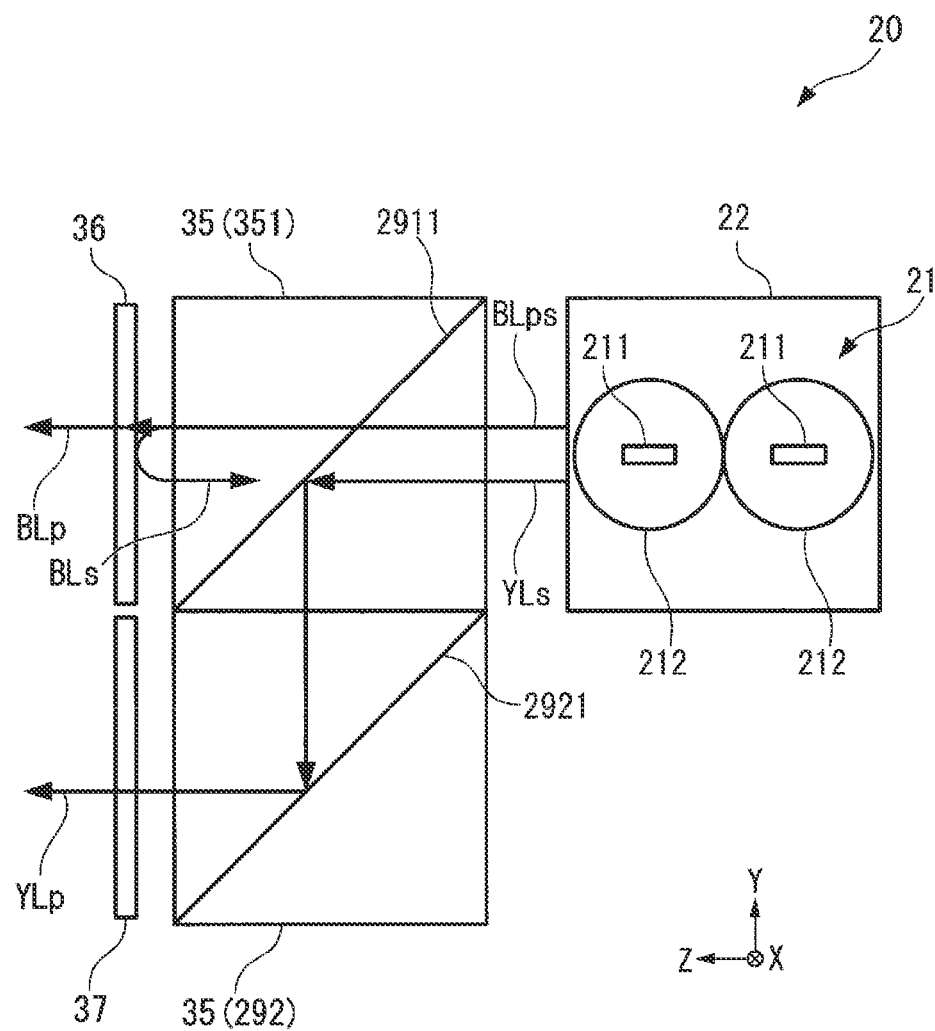
FIG. 11 is a side view of the light source device viewed from the −X direction.
Figure 12:
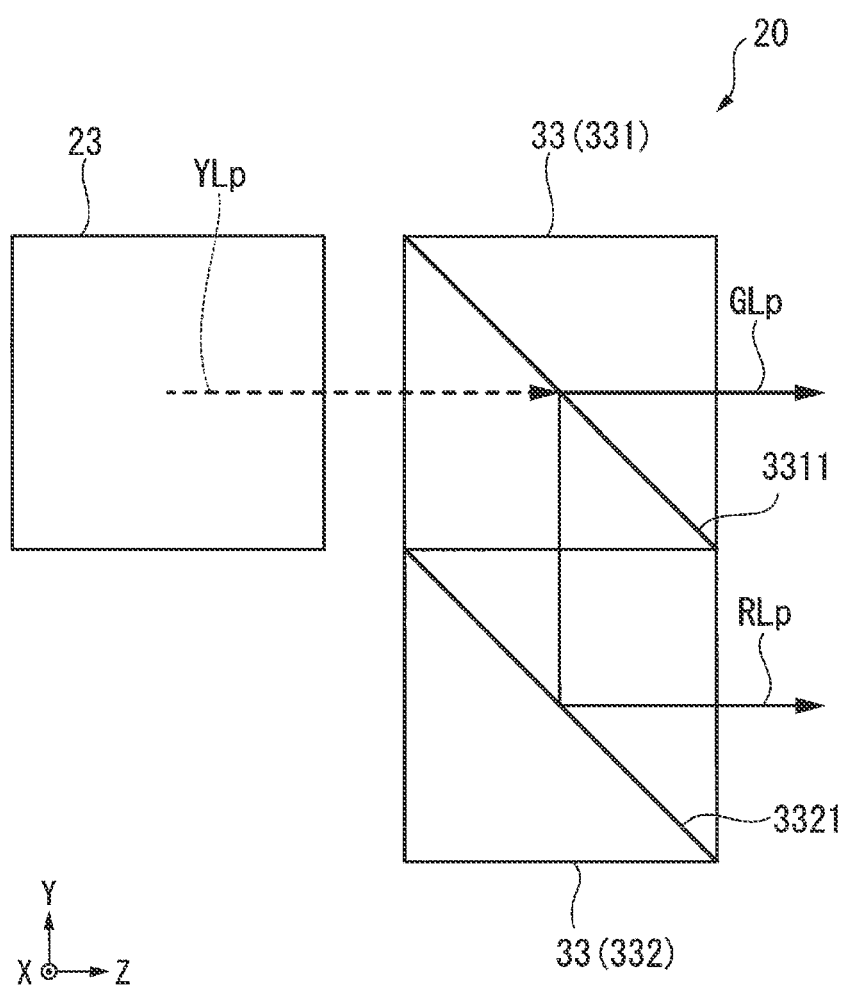
FIG. 12 is a side view of the light source device viewed from the +X direction.

In FIG. 10 through FIG. 12, the constituents common to the drawings used in the first embodiment are denoted by the same reference symbols, and the description thereof will be omitted.

As shown in FIG. 10 and FIG. 11, the light source device 20 according to the present embodiment is provided with the light source section 21, the first light separation element 22, the second light separation element 23, the first light collection element 25, the diffusion device 26, the second light collection element 27, the wavelength conversion element 28, a first color separation element 35, a reflective polarization element 36, a second retardation element 37, and the second color separation element 33.

Configuration of First Color Separation Element

In the first color separation element 35 in the present embodiment, there is disposed a dichroic prism 351 instead of the blue polarization split prism 291 in the first embodiment. In other words, the first color separation element 35 has a dichroic prism 351 and the reflecting prism 292. The dichroic prism 351 has a dichroic mirror 3511 for transmitting the blue light beam and reflecting the yellow light beam. Therefore, the blue light beam BLps having entered the dichroic prism 351 is transmitted through the dichroic mirror 3511 toward the +Z direction, and is then emitted from the dichroic prism 351. Meanwhile, the yellow light beam YLs having entered the dichroic prism 351 is reflected by the dichroic mirror 3511 toward the −Y direction, and then enters the reflecting prism 292.

Configuration of Reflective Polarization Element

The reflective polarization element 36 is disposed on the +Z direction side of the dichroic prism 351. In other words, the reflective polarization element 36 is disposed at the +Z direction side of the dichroic prism 351 on the light path of the blue light beam BLps emitted from the dichroic prism 351. The reflective polarization element 36 has a characteristic of transmitting the P-polarization component while reflecting the S-polarization component. Therefore, out of the blue light beam BLps emitted from the dichroic prism 351, the blue light beam BLp as the P-polarization component is transmitted through the reflective polarization element 36, and is then emitted from the light source device 20. In contrast, the blue light beam BLs as the S-polarization component is reflected by the reflective polarization element 36, then proceeds toward the −Z direction, and is then transmitted through the dichroic prism 351 to enter the first light separation element 22 once again.

The reflective polarization element 36 in the present embodiment corresponds to the optical element in the appended claims.

A part of the blue light beam BLs which is reflected by the reflective polarization element 36 and then enters the first light separation element 22, for example, 80% of the blue light beam BLs is transmitted through the first light separation element 22, and then enters the diffusion plate 261 via the first light collection element 25. The blue light beam BLs having entered the diffusion plate 261 is converted into the blue light beam BLps including the P-polarization component and the S-polarization component once again. Therefore, the blue light beam BLps passes through the path described above, and the blue light beam BLp as the P-polarization component which is a part of the blue light beam BLps is transmitted through the reflective polarization element 36 and is then emitted from the light source device 20. As described above, even in the blue light beam BLs once reflected by the reflective polarization element 36, a part of the blue light beam which has returned to the diffusion plate 261, and then entered the reflective polarization element 36 once again is emitted.

The yellow light beam YLs having entered the reflecting prism 292 is reflected by the reflecting layer 2921 toward the +Z direction, and is then emitted from the reflecting prism 292. The second retardation element 37 is disposed on the +Z direction side of the reflecting prism 292. The yellow light beam YLs emitted from the reflecting prism 292 enters the second retardation element 37. The second retardation element 37 is formed of a ½ wave plate with respect to the yellow wavelength band of the yellow light beam YLs. Therefore, the second retardation element 37 converts the yellow light beam YLs as the S-polarization component into the yellow light beam YLp as the P-polarization component. The yellow light beam YLp thus obtained by the conversion into the P-polarization component is emitted from the light source device 20.

As shown in FIG. 12, in the light source device 20 according to the present embodiment, unlike the first embodiment, the first retardation element is not disposed between the second light separation element 23 and the second color separation element 33. Therefore, the yellow light beam YLp emitted from the second light separation element 23 enters the second color separation element 33 without changing the polarization direction. The yellow light beam YLp having entered the second color separation element 33 is separated by the dichroic prism 331 into the green light beam GLp and the red light beam RLp. The green light beam BLp is emitted toward the +Z direction from the dichroic prism 331. The red light beam RLp is emitted toward the +Z direction from the dichroic prism 331 via the reflecting prism 332.

In such a manner, according to the present embodiment, the four colors of colored light beams uniform in the polarization direction, namely the blue light beam BLp as the P-polarization component, the yellow light beam YLp as the P-polarization component, the green light beam GLp as the P-polarization component, and the red light beam RLp as the P-polarization component, are emitted from the light source device 20. In the case of the present embodiment, out of the four light beams to be emitted from the light source device, the yellow light beam YLp is emitted instead of the white light beam WLs emitted in the first embodiment. Further, unlike the first embodiment, the four light beams uniform in polarization component, namely the P-polarization component, are emitted from the light source device 20.

Advantages of Second Embodiment

Also in the present embodiment, it is possible to obtain substantially the same advantages as in the first embodiment such as the advantage that it is possible to realize the light source device 20 capable of emitting the plurality of colored light beams made uniform in polarization direction without using the polarization conversion element narrow in pitch, and the advantage that it is possible to achieve the reduction in size of the light source device 20 and the projector 1. Further, since there is used the first light separation element 22 which does not have the polarization split characteristic of splitting the light in accordance with the polarization direction, it is possible to obtain substantially the same advantage as in the first embodiment that the loss due to the thermal strain of the light separation element is small, and it is possible to suppress the decrease in light use efficiency.

Third Embodiment

Hereinafter, a third embodiment of the present disclosure will be described using FIG. 13 through FIG. 15.

Since the basic configuration of a light source device according to the third embodiment is substantially the same as in the first embodiment, the overall description of the light source device will be omitted.

Figure 13:
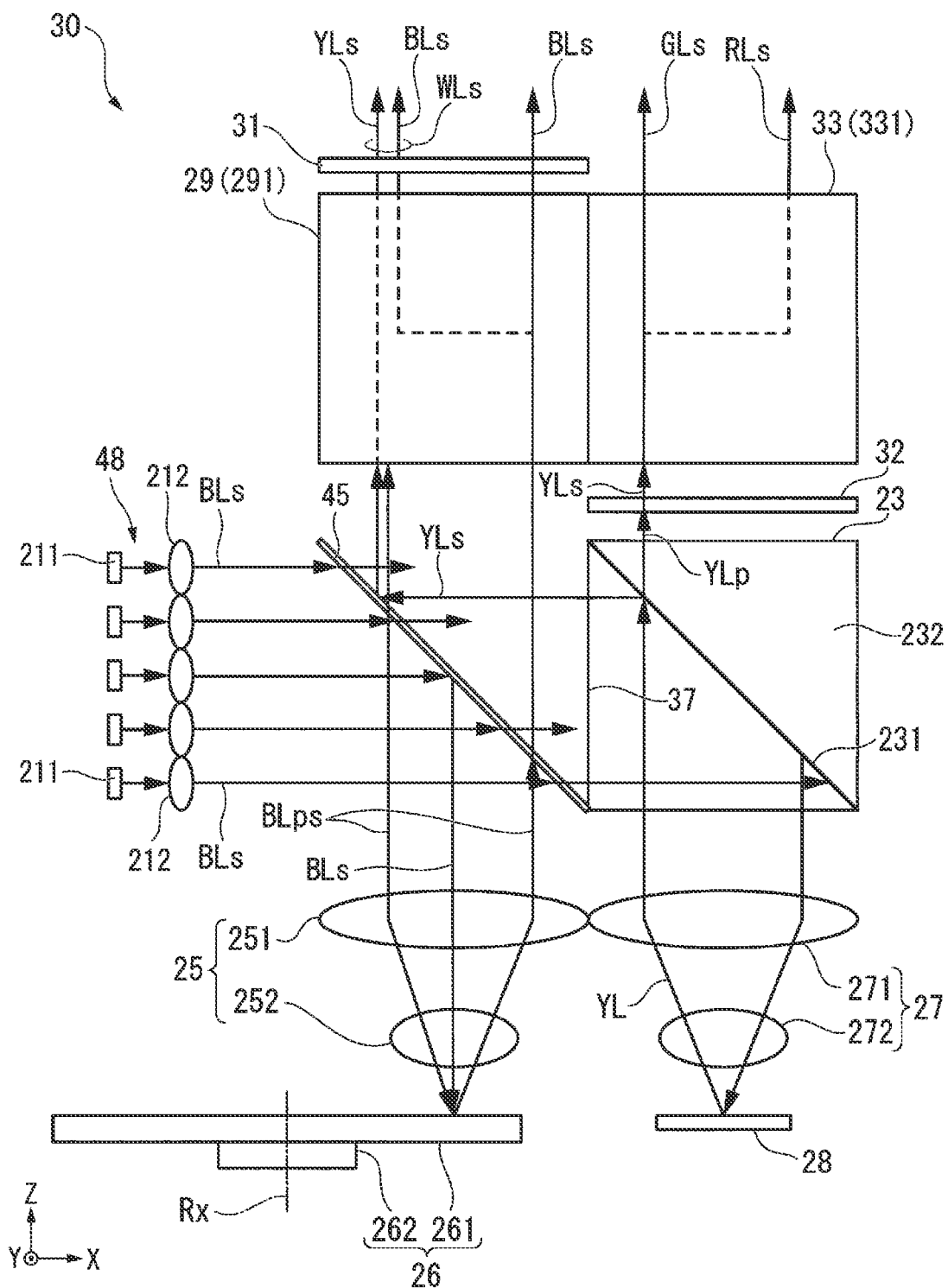
FIG. 13 is a plan view of a light source device according to a third embodiment viewed from the +Y direction.

FIG. 13 is a plan view of the light source device 30 according to the third embodiment viewed from the +Y direction. FIG. 14 is a diagram showing a first light separation element 45 viewed from a direction forming an angle of 45° with the X axis and the Z axis. FIG. 15 is a diagram showing a first light separation element 46 in a modified example viewed from a direction forming an angle of 45° with the X axis and the Z axis.

In FIG. 13, the constituents common to the drawing used in the first embodiment are denoted by the same reference symbols, and the description thereof will be omitted.

As a measure for separating the blue light beam made to enter the diffusion plate 261 and the blue light beam made to enter the wavelength conversion element 28 from each other, the light source device 2 according to the first embodiment is provided with the first light separation element 22 in which the area of incidence of light has a homogenous light separation characteristic. In contrast, the light source device 30 according to the third embodiment is provided with the first light separation element 45 in which the area of incidence of light has two areas different in light separation characteristic from each other.

As shown in FIG. 13, the light source device 30 is provided with a light source section 48, the first light separation element 45, the second light separation element 23, the first light collection element 25, the diffusion device 26, the second light collection element 27, the wavelength conversion element 28, the first color separation element 29, the wavelength-selective retardation element 31, the first retardation element 32, and the second color separation element 33.

Configuration of Light Source Section

The light source section 48 has a plurality of light emitting elements 211, and a plurality of collimator lenses 212. In the case of the present embodiment, the plurality of light emitting elements 211 is arranged in the Y-Z plane perpendicular to the X axis. Specifically, the plurality of light emitting elements 211 is constituted by totally ten light emitting elements having an arrangement in which five are arranged along the Z axis, and two are arranged along the Y axis, namely a 2×5 arrangement. It should be noted that the number of the light emitting elements 211 is not limited to ten, but can arbitrarily be modified. Further, the arrangement of the plurality of light emitting elements 211 is not limited as well.

Configuration of First Light Separation Element

Figure 14:
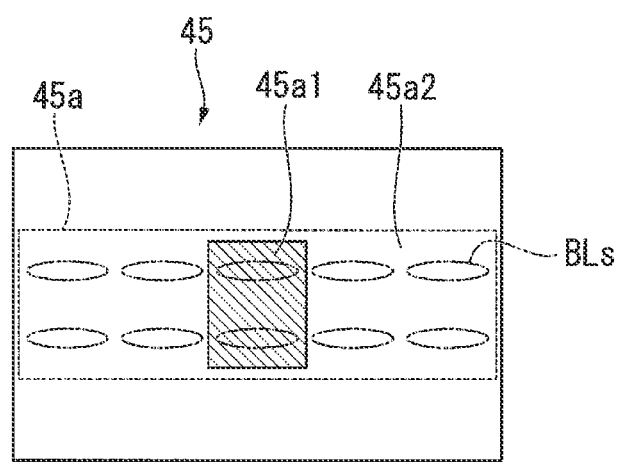
FIG. 14 is a diagram showing a first light separation element.

As shown in FIG. 14, in the first light separation element 45, the area of incidence 45a of the blue light beam BLs includes a first area 45a1 and a second area 45a2. In the case of the present embodiment, the first area 45a1 is disposed in a central part of the area of incidence 45a. The second area 45a2 is disposed in a peripheral part of the area of incidence 45a so as to surround the first area 45a1. The first area 45a1 has a reflecting layer which reflects the blue light beam BLs, and reflects the yellow light beam YLs. Further, the second area 45a2 has a reflecting layer which transmits the blue light beam BLs, and reflects the yellow light beam YLs. Thus, the blue light BLs is reflected by the first area 45a1, and is transmitted through the second area 45a2. The yellow light beam YLs is reflected by both of the first area 45a1 and the second area 45a2. In other words, in the first light separation element 45, the area of incidence 45a of the blue light beam BLs has the first area 45a1 which reflects the blue light beam BLs, and reflects the yellow light beam YLs, and the second area 45a2 which transmits the blue light beam BLs, and reflects the yellow light beam YLs. The first light separation element 45 can be manufactured by separately forming the reflecting layers having the respective reflection characteristics different from each other in the central part and the peripheral part of a light transmissive substrate.

In the example shown in FIG. 14, by appropriately setting the areas and the arrangement of the first area 45a1 and the second area 45a2, out of the ten blue light beams BLs emitted from the ten light emitting elements 211, the two blue light beams BLs located in a central area enter the first area 45a1, and the remaining eight blue light beams BLs enter the second area 45a2. Thus, as shown in FIG. 13, 20% of the blue light beams BLs emitted from the light source section 48 is reflected by the first area 45a1 of the first light separation element 45 toward the −Z direction, and proceeds toward the diffusion device 26. In contrast, 80% of the blue light beams BLs emitted from the light source section 48 is transmitted through the second area 45a2 of the first light separation element 45 toward the +X direction, and proceeds toward the wavelength conversion element 28 via the second light separation element 23. The subsequent behaviors of the blue light beam BLs proceeding toward the diffusion device 26 and the blue light beam BLs proceeding toward the wavelength conversion element 28 are substantially the same as in the first embodiment.

As shown in FIG. 13, the blue light beam BLps emitted from the diffusion device 26 is transmitted through the second area 45a2 of the first light separation element 45 toward the +Z direction, and then enters the first color separation element 29. Further, the yellow light beam YLs which is emitted from the wavelength conversion element 28, then is reflected by the second polarization split layer 231, and is then emitted from the second light separation element 23 is reflected by the first area 45a1 and the second area 45a2 of the first light separation element 45 toward the +Z direction, and then enters the first color separation element 29. The behaviors of the respective light beams in the first color separation element 29 and the second color separation element 33 are substantially the same as in the first embodiment.

Advantages of Third Embodiment

Also in the present embodiment, it is possible to obtain substantially the same advantages as in the first embodiment such as the advantage that it is possible to realize the light source device 30 capable of emitting the plurality of colored light beams made uniform in polarization direction without using the polarization conversion element narrow in pitch, and the advantage that it is possible to achieve the reduction in size of the light source device 30 and the projector 1. Further, since there is used the first light separation element 45 which does not have the polarization split characteristic of splitting the light in accordance with the polarization direction, it is possible to obtain substantially the same advantage as in the first embodiment that the loss due to the thermal strain of the light separation element is small, and it is possible to suppress the decrease in light use efficiency.

Further, in the case of the present embodiment, since there is used the first light separation element 45 having the first area 45a*l* and the second area 45a2 different in reflection characteristic from each other, it is possible to adjust the ratio in light intensity between the blue light beam made to enter the diffusion plate 261 and the blue light beam made to enter the wavelength conversion element 28 by changing the area ratio between the first area 45a*l* and the second area 45a2. Thus, it is possible to adjust the white balance of the light emitted from the light source device 30.

It should be noted that as described below, in the first light separation element 45, it is not necessarily required to dispose the first area 45a*l* in the central part of the area of incidence 45a, and dispose the second area 45a2 in the peripheral part of the area of incidence 45a.

Figure 15:
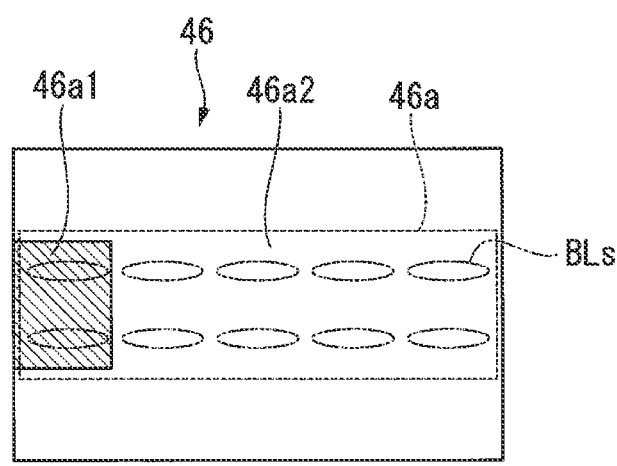
FIG. 15 is a diagram showing a modified example of the first light separation element.

FIG. 15 is a diagram showing a first light separation element 46 as a modified example.

As shown in FIG. 15, in the first light separation element 46 in the modified example, a first area 46a1 is disposed at one end of an area of incidence 46a. A second area 46a2 corresponds to an area other than the first area 46a1. Out of the ten blue light beams BLs, the two blue light beams BLs located at the left end enter the first area 46a*l*, and the remaining eight blue light beams BLs enter the second area 46a2.

In general, the light reflected by the diffusion element has a luminance distribution in which the luminance is high in a central part of the diffusion area, and the luminance is low in a peripheral part of the diffusion area. When using the first light separation element 46 in the present modified example, the proportion that the blue light beam BLps which is reflected by the central part of the diffusion area and is high in luminance is transmitted through the second area 46a2 out of the blue light beam BLps reflected by the diffusion plate 261 becomes high compared to that in the first light separation element 45 shown in FIG. 14. Thus, it is possible to efficiently guide the blue light beam BLps reflected by the diffusion plate 261 to the optical system in the posterior stage, and thus, it is possible to increase the use efficiency of the blue light beam.

Fourth Embodiment

A fourth embodiment of the present disclosure will hereinafter be described using FIG. 16.

Since the basic configuration of a light source device according to the fourth embodiment is substantially the same as in the first embodiment, the overall description of the light source device will be omitted.

Figure 16:
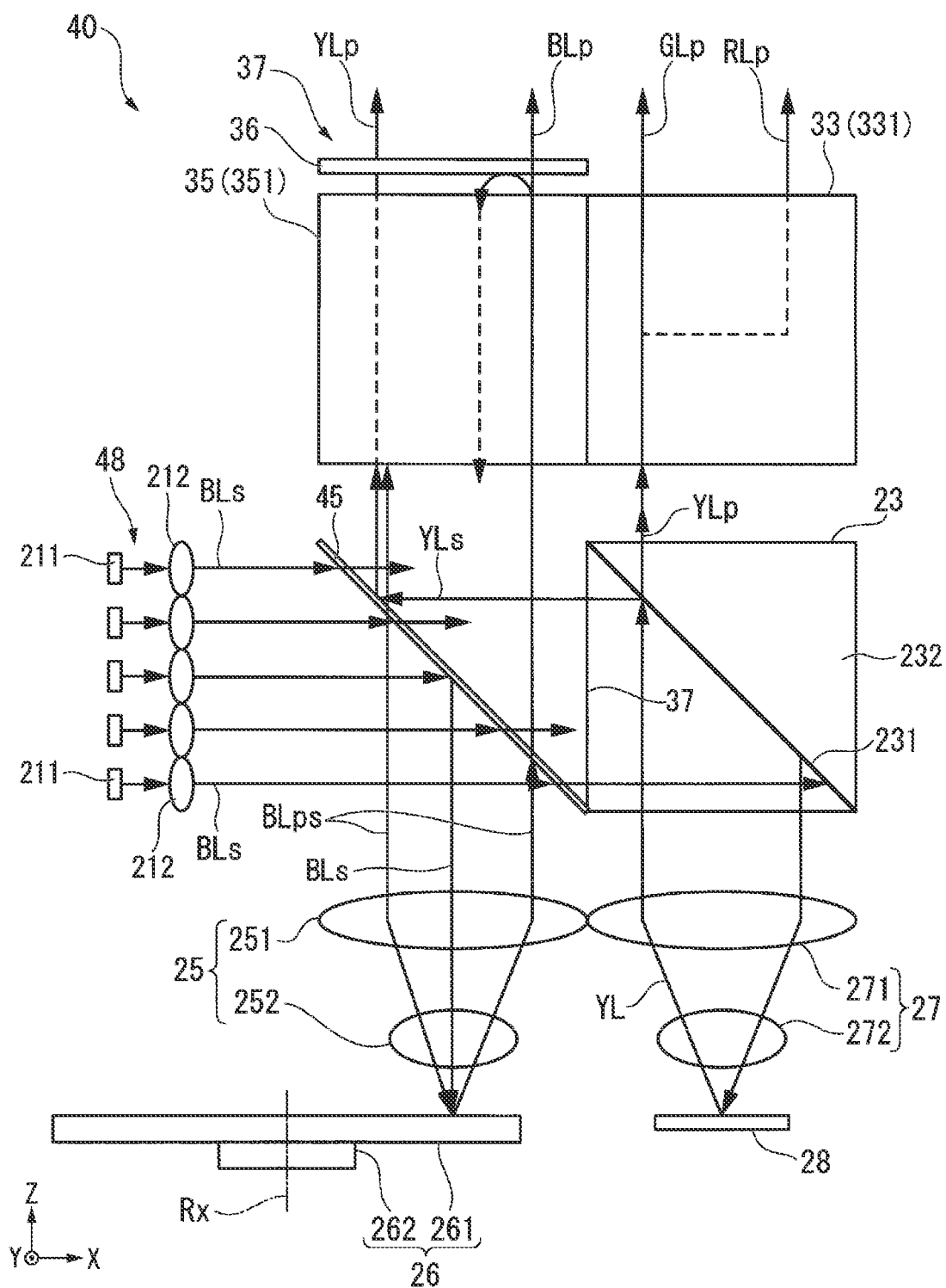
FIG. 16 is a plan view of a light source device according to a fourth embodiment viewed from the +Y direction.

FIG. 16 is a plan view of the light source device 40 according to the fourth embodiment viewed from the +Y direction.

In FIG. 16, the constituents common to the drawings used in the previous embodiments are denoted by the same reference symbols, and the description thereof will be omitted.

As shown in FIG. 16, the light source device 40 according to the present embodiment is provided with the light source section 48, the first light separation element 45, the second light separation element 23, the first light collection element 25, the diffusion device 26, the second light collection element 27, the wavelength conversion element 28, the first color separation element 35, the reflective polarization element 36, the second retardation element 37, and the second color separation element 33.

In other words, the light source device 40 according to the present embodiment is a light source device obtained by combining the light source section 48 and the first light separation element 45 in the third embodiment, and the first color separation element 35, the reflective polarization element 36, and the second retardation element 37 in the second embodiment with each other. The rest of the configuration of the light source device 40 is substantially the same as that of the light source device 2 according to the first embodiment.

Advantages of Fourth Embodiment

Also in the present embodiment, it is possible to obtain substantially the same advantages as in the first embodiment such as the advantage that it is possible to realize the light source device 40 capable of emitting the plurality of colored light beams made uniform in polarization direction without using the polarization conversion element narrow in pitch, and the advantage that it is possible to achieve the reduction in size of the light source device 40 and the projector 1. Further, since there is used the first light separation element 45 which does not have the polarization split characteristic of splitting the light in accordance with the polarization direction, it is possible to obtain substantially the same advantage as in the first embodiment that the loss due to the thermal strain of the light separation element is small, and it is possible to suppress the decrease in light use efficiency.

It should be noted that the scope of the present disclosure is not limited to the embodiments described above, but a variety of modifications can be provided thereto within the scope or the spirit of the present disclosure.

For example, in the embodiments described above, the position where the first color separation element emits the white light beam WLs or the yellow light beam YLp is a position at the −Y direction side of the position where the first color separation element emits the blue light beam BLs, BLp, and the position where the second color separation element emits the red light beam RLs, RLp is a position at the −Y direction side of the position where the second color separation element emits the green light beam GLs, GLp. Instead of this arrangement, the position where the first color separation element emits the white light beam WLs or the yellow light beam YLp can be a position at the +Y direction side of the position where the first color separation element emits the blue light beam BLs, BLp, and the position where the second color separation element emits the red light beam RLs, RLp can be a position at the +Y direction side of the position where the second color separation element emits the green light beam GLs, GLp.

The light source devices according to the embodiments described above are each provided with the first light collection element 25 and the second light collection element 27. However, this configuration is not a limitation, but at least one of the first light collection element 25 and the second light collection element 27 is not required to be disposed.

Although in each of the embodiments described above, the light source section 21 emits the blue light beams BLs toward the +X direction, this configuration is not a limitation, but it is possible for the light source section 21 to have a configuration of emitting the blue light beams BLs toward a direction crossing the +X direction, and reflecting the blue light beams BLs toward the +X direction using, for example, a reflecting member, and then making the blue light beams BLs enter the first light separation element 22.

In each of the embodiments described above, the projector is provided with the homogenization device 4 having the first multi-lens 41, the second multi-lens 42, and the superimposing lens 43. Instead of this configuration, it is possible to dispose a homogenization device have another configuration, it is not required to dispose the homogenization device 4.

The light source device 2 according to the first embodiment described above and the light source device 20 according to the second embodiment each emit the colored light beams from the four exit positions, respectively, and the liquid crystal panel 61 constituting the light modulation device 6 has the four sub-pixels SX in each of the pixels PX. Instead of this configuration, it is possible to adopt a configuration in which the light source device emits three colored light beams, and the liquid crystal panel has three sub-pixels in each pixel. In this case, for example, in the light source devices according to the embodiments described above, a total reflection member can be disposed in the light path of the yellow light beam YLs.

The light source device according to the embodiment described above emits the blue light beam BLs, the white light beam WLs, the green light beam GLs, and the red light beam RLs which are each an S-polarization component, and are spatially separated from each other. Alternatively, the light source device according to the embodiment described above emits the blue light beam BLp, the yellow light beam YLp, the green light beam GLp, and the red light beam RLp which are each a P-polarization component, and are spatially separated from each other. Instead of these configurations, the polarization state of the colored light beams emitted by the light source device can be another polarization state. Further, the colored light beams emitted by the light source device are not limited to the blue light beam, the yellow light beam, the green light beam, and the red light beam, but can also be other colored light beams.

Besides the above, the specific descriptions of the shape, the number, the arrangement, the material, and so on of the constituents of the light source device and the projector are not limited to those of the embodiments described above, but can arbitrarily be modified. Further, although in the embodiments described above, there is described the example of installing the light source device according to the present disclosure in the projector, the example is not a limitation. The light source device according to an aspect of the present disclosure can also be applied to lighting equipment, a headlight of a vehicle, and so on.

What is claimed is:

1. A light source device comprising:
   a light source section configured to emit first light having a first wavelength band;
   a first light separation element configured to transmit a part of the first light which enters the first light separation element along a first direction from the light source section, toward the first direction irrespective of a polarization component, and reflect another part of the first light toward a second direction crossing the first direction irrespective of a polarization component;
   a second light separation element disposed at the first direction side of the first light separation element, and configured to reflect a part of the first light which enters the second light separation element along the first direction from the first light separation element, toward the second direction;
   a diffusion element disposed at the second direction side of the first light separation element, and configured to diffuse and then emit another part of the first light which enters the diffusion element along the second direction from the first light separation element, toward a third direction as an opposite direction to the second direction; and
   a wavelength conversion element disposed at the second direction side of the second light separation element, and configured to perform wavelength conversion on a part of the first light which enters the wavelength conversion element along the second direction from the second light separation element, to emit second light having a second wavelength band different from the first wavelength band toward the third direction, wherein
   the second light separation element transmits a first polarization component toward the third direction with respect to the second light, and reflects a second polarization component of the second light toward a fourth direction as an opposite direction to the first direction.

2. The light source device according to claim 1, wherein in the first light separation element, an entire area of incidence of the first light transmits a part of the first light, reflects another part of the first light, and reflects the second polarization component.

3. The light source device according to claim 1, wherein in the first light separation element, the area of incidence of the first light includes a first area configured to reflect the first light and reflect the second polarization component, and a second area configured to transmit the first light and reflect the second polarization component.

4. The light source device according to claim 1, further comprising:
   an optical element configured to uniform a polarization direction of another part of the first light which is emitted from the diffusion element and is transmitted through the first light separation element into a specific direction and emit the another part of the first light.

5. The light source device according to claim 1, further comprising:
   a first retardation element configured to convert the first polarization component which is emitted toward the third direction from the second light separation element into the second polarization component.

6. The light source device according to claim 1, further comprising:
   a first color separation element disposed at the third direction side of the first light separation element, and configured to separate light emitted from the first light separation element into third light having the first wavelength band and fourth light having the second wavelength band; and
   a second color separation element disposed at the third direction side of the second light separation element, and configured to separate light emitted from the second light separation element into fifth light having a third wavelength band different from the second wavelength band, and sixth light having a fourth wavelength band different from the second wavelength band and the third wavelength band.

7. A projector comprising:
   the light source device according to claim 6;
   a light modulation device configured to modulate light from the light source device in accordance with image information; and
   a projection optical device configured to project the light modulated by the light modulation device.

8. The projector according to claim 7, further comprising:
   a homogenization device disposed between the light source device and the light modulation device, wherein the homogenization device includes
- a pair of multi-lenses configured to divide the light entering the pair of multi-lenses from the light source device into a plurality of partial light beams, and
- a superimposing lens configured to superimpose the plurality of partial light beams entering the superimposing lens from the pair of multi-lenses on the light modulation device.

9. The projector according to claim 8, wherein
the light modulation device has a plurality of pixels,
the pixels each include a first sub-pixel, a second sub-pixel, a third sub-pixel, and a fourth sub-pixel, and
with respect to each of the pixels, the third light enters the first sub-pixel, the fourth light enters the second sub-pixel, the fifth light enters the third sub-pixel, and the sixth light enters the fourth sub-pixel.

\* \* \* \* \*